US008150036B2

(12) United States Patent
Paykin et al.

(10) Patent No.: US 8,150,036 B2
(45) Date of Patent: Apr. 3, 2012

(54) ENCRYPTED DATA INSTALLATION

(75) Inventors: Bronislav Paykin, Mentone (AU);
Bryan D. Wolf, Reno, NV (US)

(73) Assignee: IGT, Reno, NV (US)

( * ) Notice: Subject to any disclaimer, the term of this patent is extended or adjusted under 35 U.S.C. 154(b) by 961 days.

(21) Appl. No.: 11/932,152

(22) Filed: Oct. 31, 2007

(65) Prior Publication Data

US 2009/0110195 A1    Apr. 30, 2009

(51) Int. Cl.
*H04K 1/00* (2006.01)
(52) U.S. Cl. ....................................................... 380/251
(58) Field of Classification Search .................... 380/251
See application file for complete search history.

(56) References Cited

U.S. PATENT DOCUMENTS

| 5,363,448 | A | * | 11/1994 | Koopman et al. ............. 713/170 |
| 5,894,516 | A |   | 4/1999  | Brandenburg |
| 2006/0198515 | A1 | | 9/2006 | Forehand et al. |
| 2009/0191961 | A1 | * | 7/2009 | McCoull et al. ................ 463/29 |

FOREIGN PATENT DOCUMENTS

| EP | 1168185 A3 | 1/2004 |
| EP | 1536308 A2 | 6/2005 |
| WO | WO2007/062189 A2 | 5/2007 |
| WO | WO 2009/058743 | 5/2009 |

OTHER PUBLICATIONS

"Momentus 5400 FDE.2, Best-in-class security for data at rest," Product Overview, Seagate Technology LLC, PO0029.2-0703US, Mar. 2007. 2 pp.
"Momentus 5400 FDE.2, Data-at-rest security drive for laptop PCs," Data Sheet, Seagate Technology LLC, DS1606.1-0703US, Mar. 2007. 2 pp.
International Search Report and Written Opinion dated May 15, 2009, including Notification of Transmittal, issued in PCT/US2008/081375.
International Preliminary Report on Patentability mailed May 4, 2010, from Application No. PCT/US2008/081375.

* cited by examiner

*Primary Examiner* — Kambiz Zand
*Assistant Examiner* — Stephen Sanders
(74) *Attorney, Agent, or Firm* — Weaver Austin Villeneuve & Sampson LLP

(57) ABSTRACT

A base encryption method may be applied to plain data to form base encrypted data. An installation encryption method may be applied to the base encryption data to provide encrypted installation data. During installation, the encrypted installation data are encrypted to form encrypted storage data for storage on a storage medium such as a hard drive. Preferably, the data are not fully decrypted at any stage of the installation process. The host CPU may be minimally involved (or not involved) in the encryption/decryption process. Some embodiments provide a logic seal (a/k/a a "telltale circuit") that monitors access to a machine. In some such implementations, an encryption/decryption key may be stored in the logic seal. When the logic seal is broken, countermeasures may be taken, e.g., at least some data may be deleted. For example, one or more cryptographic keys may be erased.

50 Claims, 14 Drawing Sheets

ENCRYPTED DATA INSTALLATION

FIELD OF THE INVENTION

The present invention relates generally to providing data securely, particularly to wager gaming devices.

BACKGROUND OF THE INVENTION

Providing data in a secure manner is a concern shared by many software and content providers. For example, game developers such as the present assignee spend considerable amounts of time, effort and money providing interesting wagering games. Previously, however, there was little to prevent customers from making unauthorized copies of wagering games. Wagering game data was provided to customers on installation media (such as CDs and DVDs) as plain data, without encryption. Moreover, wagering games were stored as plain data on the hard drives of electronic gaming machines. It would be desirable to improve at least some of these prior art methods, devices and/or systems.

SUMMARY OF THE INVENTION

Some implementations of the invention apply a base encryption method to plain data, such as wagering game data, to form base encrypted data. An installation encryption method may be applied to the base encryption data to provide encrypted installation data. The base encryption method and the installation encryption method may be applied as part of a single process, thereby transforming the plain data to encrypted installation data. During installation, the encrypted installation data are encrypted to form encrypted storage data for storage on a storage medium such as a hard drive. Preferably, the data are not fully decrypted at any stage of the installation process.

During gaming machine operation, encryption and decryption processes may be performed by a hard drive at a SATA/PATA interface speed. In some preferred implementations, the host CPU is minimally involved (or not involved) in the encryption/decryption process.

Some embodiments provide a logic seal (a/k/a a "tell-tale circuit") that monitors access to the main logic board and/or the main storage device(s). In some such implementations, an encryption/decryption key may be stored in the logic seal. When the logic seal is broken, countermeasures may be taken, e.g., at least some data may be deleted. For example, one or more cryptographic keys may be erased.

Some embodiments of the invention provide a gaming machine, comprising: an interface system comprising at least one device configured for receiving data; a memory system comprising at least one memory; and a logic system comprising at least one logic device. The logic system may be configured to do the following: receive first encrypted data from the interface system, the first encrypted data formed by encrypting unencrypted data via at least a first encryption operation and a second encryption operation; perform a first decryption operation on the first encrypted data to produce partially decrypted data; and perform a third encryption operation on the partially decrypted data to produce second encrypted data. The logic system may be further configured to store the second encrypted data in the memory system. The logic system may be further configured to delete, after performing the first decryption operation, first decryption data for performing the first decryption operation.

At least a portion of the logic system may be associated with the memory. The memory system may comprise, e.g., a hard drive. If so, at least a portion of the logic system may be associated with (e.g., disposed within) the hard drive.

The interface system may comprises a device configured for receiving data from a portable storage medium. For example, the interface system may comprise a Universal Serial Bus ("USB") interface and/or an optical disk drive. The logic system may be further configured to receive first decryption data for performing the first decryption operation from the portable storage medium. The interface system may comprise at least one network interface.

The second decryption data for performing the second decryption operation and third decryption data for performing the third decryption operation may, for example, be stored in the memory system. The gaming machine may further comprises a device integrity system configured to detect device tampering. If so, the device integrity system may be configured to provide a device tampering indication to the logic system. The gaming machine may be further configured to delete at least one of the second decryption data or the third decryption data upon receiving the device tampering indication. For example, the logic system and/or the device integrity system may be configured to delete decryption data upon receiving the device tampering indication. The device integrity system may comprise a tell-tale circuit.

Second decryption data for performing the second decryption operation and third decryption data for performing the third decryption operation may be stored in the memory system. The logic system may be further configured to do the following: retrieve the second encrypted data; retrieving the second decryption data and the third decryption data; and decrypt the second encrypted data with the second decryption data and the third decryption data, thereby producing the unencrypted data.

In some implementations, the partially decrypted data may be equivalent to the unencrypted data encrypted via one of the first encryption operation or the second encryption operation. The second encrypted data may be equivalent to the unencrypted data encrypted via the second and third encryption operations or via the first and third encryption operations.

In some implementations, the first encrypted data may formed by encrypting the unencrypted data via the first encryption operation, the second encryption operation and a fourth encryption operation. The logic system may be further configured to perform a second decryption operation on the partially decrypted data to undo the fourth encryption operation and to produce third encrypted data. The logic system may be further configured to store the third encrypted data in the memory system.

The logic system may comprise one or more logic devices, such as processors, programmable logic devices, etc. The logic system may comprise a gaming controller configured for executing decrypted software. In some implementations, the gaming controller is not involved in encryption or decryption operations.

Alternative gaming machines are described herein. Some such gaming machines may include the following elements: apparatus for providing wagering games; apparatus for receiving first encrypted data formed by encrypting plain data with at least first and second encryption keys; apparatus for receiving the second encryption key; decryption apparatus for decrypting the first encrypted data with the second encryption key to produce partially encrypted data; apparatus for deleting the second encryption key; a memory for storing third and fourth encryption keys; apparatus for encrypting the partially encrypted data with the third and fourth encryption keys to produce second encrypted data; storage apparatus for storing the second encrypted data.

The gaming machine may further comprising apparatus for receiving an indication of gaming machine tampering; and apparatus for deleting at least one of the third and fourth encryption keys. The apparatus for receiving an indication of gaming machine tampering may comprise a tell-tale circuit. The plain data may comprise game theme software. The apparatus for providing wagering games may further comprises apparatus for receiving an indication to execute the game theme software. The decryption apparatus may further comprise: apparatus for retrieving the second encrypted data; apparatus for retrieving the first, third and fourth encryption keys; and apparatus for decrypting the second encrypted data with the first, third and fourth keys to produce decrypted game theme software.

The first encrypted data may, in some instances, be formed by encrypting the plain data with first, second and fifth encryption keys. The decrypting apparatus may further comprise apparatus for decrypting the first encrypted data with the second and fifth encryption keys. The deleting apparatus may further comprise apparatus for deleting the fifth key from the portable storage medium. The decrypting apparatus may comprises apparatus for communicating with a portable storage medium having the second and fifth encryption keys stored thereon.

The apparatus for receiving first encrypted data may comprises apparatus for receiving a portable storage medium having the first encrypted data stored thereon. The portable storage medium may comprise an optical disk. Alternatively (or additionally), the portable storage medium may comprise a Universal Serial Bus ("USB") key.

The apparatus for receiving first encrypted data may comprise an interface of the gaming machine. For example, the apparatus for receiving first encrypted data may comprise a USB port. The interface may comprise a network interface configurable for receiving a download of the first encrypted data.

The first encryption key may also be stored in a memory. The decryption apparatus may be further configured to do the following: retrieve the second encrypted data; retrieve the first, third and fourth encryption keys; and decrypt the second encrypted data with the first, third and fourth encryption keys. The decryption apparatus may comprise a logic device associated with the storage apparatus. The gaming machine may further comprise the following: a first portion configured for operation according to the serial advanced technology attachment ("SATA") standard; and a second portion configured for operation according to the parallel advanced technology attachment ("PATA") standard. The decryption apparatus may be configured to operate at a speed of data transfer between the first portion and the second portion. The apparatus for encrypting the partially encrypted data may also be configured to operate at a speed of data transfer between the first portion and the second portion.

The apparatus for providing wagering games may comprise a master game controller. The master game controller may or may not comprise part of the decryption apparatus.

The apparatus for receiving the second encryption key may comprise apparatus for forming a communication between a portable storage medium and the gaming machine. The portable storage medium may have the second key stored thereon.

Some implementations of the invention provide a method that may include the following steps: receiving, at a device, first encrypted data formed by encrypting plain data with at least first and second encryption keys; receiving, at the device, the second encryption key; decrypting the first encrypted data with the second encryption key to produce partially encrypted data; deleting the second encryption key; encrypting the partially encrypted data with third and fourth encryption keys stored in a memory of the device to produce second encrypted data; and storing the second encrypted data in a storage medium of the device. The steps of the method may be performed, at least in part, by one or more components of a wager gaming machine.

In some such implementations, the first encrypted data may be formed by encrypting the plain data with first, second and fifth encryption keys. The method may further comprise: receiving an indication of device tampering and deleting the third and/or the fourth encryption key. The decrypting step may involve decrypting the first encrypted data with the second and fifth encryption keys. The decrypting step may involve forming a communication between a portable storage medium and the device, the portable storage medium having the second and fifth keys stored thereon.

The plain data may comprise game theme software. The method may further comprise: receiving an indication to execute the game theme software; retrieving the second encrypted data; retrieving the first, third and fourth encryption keys; and decrypting the second encrypted data with the first, third and fourth keys to produce decrypted game theme software. The step of decrypting the second encrypted data may be performed by a first logic device. The method may further comprise the step of executing the decrypted game theme software with a second logic device. The first logic device may be associated with the storage medium. The second logic device may comprise a game controller of the wager gaming machine.

The step of decrypting the second encrypted data may be performed at a speed of data transfer between serial advanced technology attachment ("SATA") and parallel advanced technology attachment ("PATA") portions of a device. The deleting step may comprise deleting the fifth key from the portable storage medium.

The step of receiving first encrypted data may involve receiving a portable storage medium having the first encrypted data stored thereon. The step of receiving first encrypted data may involve receiving the first encrypted data via an interface of the device.

The first encryption key may also be stored in a memory of (or at least accessible by) the device. If so, the method may further comprise: retrieving the second encrypted data; retrieving the first, third and fourth encryption keys; and decrypting the second encrypted data with the first, third and fourth encryption keys. The decrypting step may comprise forming a communication between a portable storage medium and the device, the portable storage medium having the second key stored thereon.

The step of receiving first encrypted data may comprise receiving an optical disk, receiving a Universal Serial Bus ("USB") key, etc. The interface may comprise a network interface and the step of receiving first encrypted data may comprise receiving a download of the first encrypted data via the network interface.

Alternative embodiments of the invention provide a device, comprising: apparatus for receiving first encrypted data formed by at least a first encryption operation and a second encryption operation; apparatus for performing a first decryption operation on the first encrypted data to produce partially decrypted data; apparatus for performing a third encryption operation on the partially decrypted data to produce second encrypted data; apparatus for storing the second encrypted data; and apparatus for disabling the means for performing the first decryption operation. The device may or may not comprise apparatus for providing a wagering game.

The partially decrypted data may be equivalent to the plain data encrypted via the second encryption operation. The second encrypted data may be equivalent to the plain data encrypted via the second and third encryption operations.

The first encrypted data may, for example, be formed by encrypting the plain data via first, second and fourth encryption operations. The decrypting apparatus may be further configured to decrypt the first encrypted data with a fourth decryption process.

The device may further comprise: a memory for storing data for performing a second decryption operation and a third decryption operation; apparatus for receiving an indication of device tampering; and apparatus for deleting the data for performing at least one of the second decryption operation and the third decryption operation when an indication of device tampering is received.

The apparatus for receiving first encrypted data may comprise apparatus for receiving a portable storage medium having the first encrypted data stored thereon. The apparatus for receiving first encrypted data may comprises an interface of the device.

Data for performing a second decryption operation and a third decryption operation may, in some implementations, be stored in the device. The device may further comprise: apparatus for retrieving the second encrypted data; apparatus for retrieving the data for performing the second decryption operation and the third decryption operation; and apparatus for decrypting the second encrypted data with the data for performing the second decryption operation and the third decryption operation, thereby producing the plain data.

The decrypting apparatus may comprise apparatus for communicating with a portable storage medium having data for performing the first decryption operation stored thereon.

The apparatus for receiving first encrypted data may comprise apparatus for receiving an optical disk. The apparatus for receiving first encrypted data may comprise a Universal Serial Bus ("USB") port. The apparatus for receiving first encrypted data may comprises a network interface for receiving a download of the first encrypted data.

Alternative methods of the invention may include these steps: receiving first encrypted data formed by encrypting plain data via at least a first encryption operation and a second encryption operation; performing a first decryption operation on the first encrypted data to produce partially decrypted data; performing a third encryption operation on the partially decrypted data to produce second encrypted data; storing the second encrypted data in a memory of a device; and deleting data for performing the first decryption operation. According to some such methods, the steps may be performed, at least in part, by a wager gaming machine.

The partially decrypted data may be equivalent to the plain data encrypted via the second encryption operation. The second encrypted data may be equivalent to the plain data encrypted via the second and third encryption operations.

The first encrypted data may be formed by encrypting the plain data via first, second and fourth encryption operations. The decrypting step may further comprise decrypting the first encrypted data with a fourth decryption process.

Data for performing a second decryption operation and a third decryption operation may be stored in the device. If so, the method may further comprise: receiving an indication of device tampering; and deleting the data for performing at least one of the second decryption operation and the third decryption operation. The method may further comprise: retrieving the second encrypted data; retrieving the data for performing the second decryption operation and the third decryption operation; and decrypting the second encrypted data with the data for performing the second decryption operation and the third decryption operation, thereby producing the plain data.

The step of receiving first encrypted data may comprise receiving a portable storage medium having the first encrypted data stored thereon. The step of receiving first encrypted data may comprise receiving the first encrypted data via an interface of the device. The decrypting step may comprise forming a communication between a portable storage medium and the device, the portable storage medium having data for performing the first decryption operation stored thereon.

The step of receiving first encrypted data may comprise receiving an optical disk. The step of receiving first encrypted data may comprise receiving a Universal Serial Bus ("USB") key. The step of receiving first encrypted data may comprise receiving a download of the first encrypted data via a network interface.

EXAMPLE EMBODIMENTS

Figure 1A:
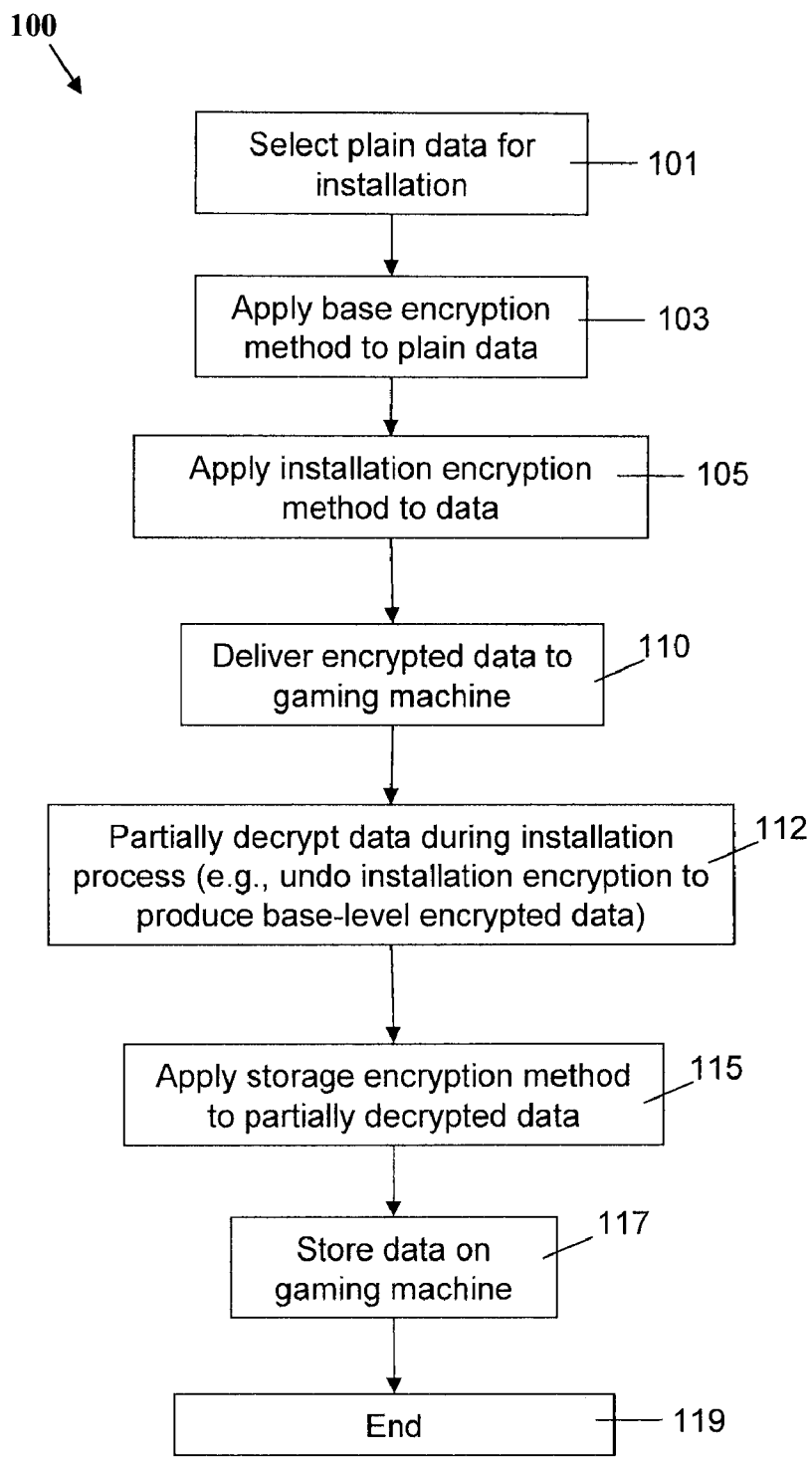
FIG. 1A is a flow chart that outlines some implementations of the invention.

In this application, numerous specific details are set forth in order to provide a thorough understanding of the present invention. However, the present invention may be practiced without some or all of these specific details. In other instances, well known process steps have not been described in detail in order not to obscure the present invention.

Reference will now be made in detail to some specific examples of the invention, including the best modes contemplated by the inventor for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

Various techniques and mechanisms of the present invention will sometimes be described in singular form for clarity. However, it should be noted that some embodiments include multiple iterations of a technique or multiple instantiations of a mechanism unless noted otherwise. For example, a system may use a logic device, such as a processor, in a variety of contexts. However, it will be appreciated that a system can use multiple logic devices for similar purposes, while remaining within the scope of the present invention.

Furthermore, the techniques and mechanisms of the present invention will sometimes describe and/or illustrate a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, an indicated connection does not necessarily mean a direct, unimpeded connection unless otherwise noted. Moreover, there may be other connections between entities than are indicated herein, e.g., in network diagrams.

Many implementations of the invention relate to data encryption and decryption. Although many such implementations of the invention are described in the context of providing data to wager machines in a gaming establishment, the invention is not limited to the gaming context. Instead, the invention has broad applicability to many aspects of modern life in which the confidentiality of data may be a concern and/or where it would be desirable to prevent uncontrolled copying of data. Such contexts may include, but are not limited to, the distribution of music, videos, software and/or other data, financial transactions (including e-commerce), etc. (As used herein, the term "data" will be used broadly to include information and content such as image data, sound data, gaming data, financial data, etc., as well as software.)

An overview of some data encryption processes of the invention is provided by flow chart 100 of FIG. 1A. It will be appreciated that the steps indicated in flow chart 100 (as with other methods shown and described herein) are not necessarily performed in the order indicated. It should also be understood that the methods of the invention may include more or fewer steps than are indicated. For example, there may be other steps (such as payment steps, authentication steps, licensing steps, etc.), involved in the process that are not indicated in FIG. 1A.

In step 101, unencrypted data, which will often be referred to herein as "plain data" or the like, are selected for distribution and/or installation. These plain data may be, for example, software selected by a customer, an upgrade to previously-provided data selected by a data provider, etc. In this example, the plain data comprise wagering game data for a new wagering game selected by a customer.

In step 103, a base encryption method is applied to the plain data. In step 105, an installation encryption method is applied to the base encryption data to form encrypted installation data. In some preferred implementations, the base encryption method and the installation encryption method may be applied as part of a single process, thereby transforming the plain data to encrypted installation data. The details of some such implementations are described below, e.g., with reference to FIGS. 2A, 3A, 4A and 5A.

Figure 1B:
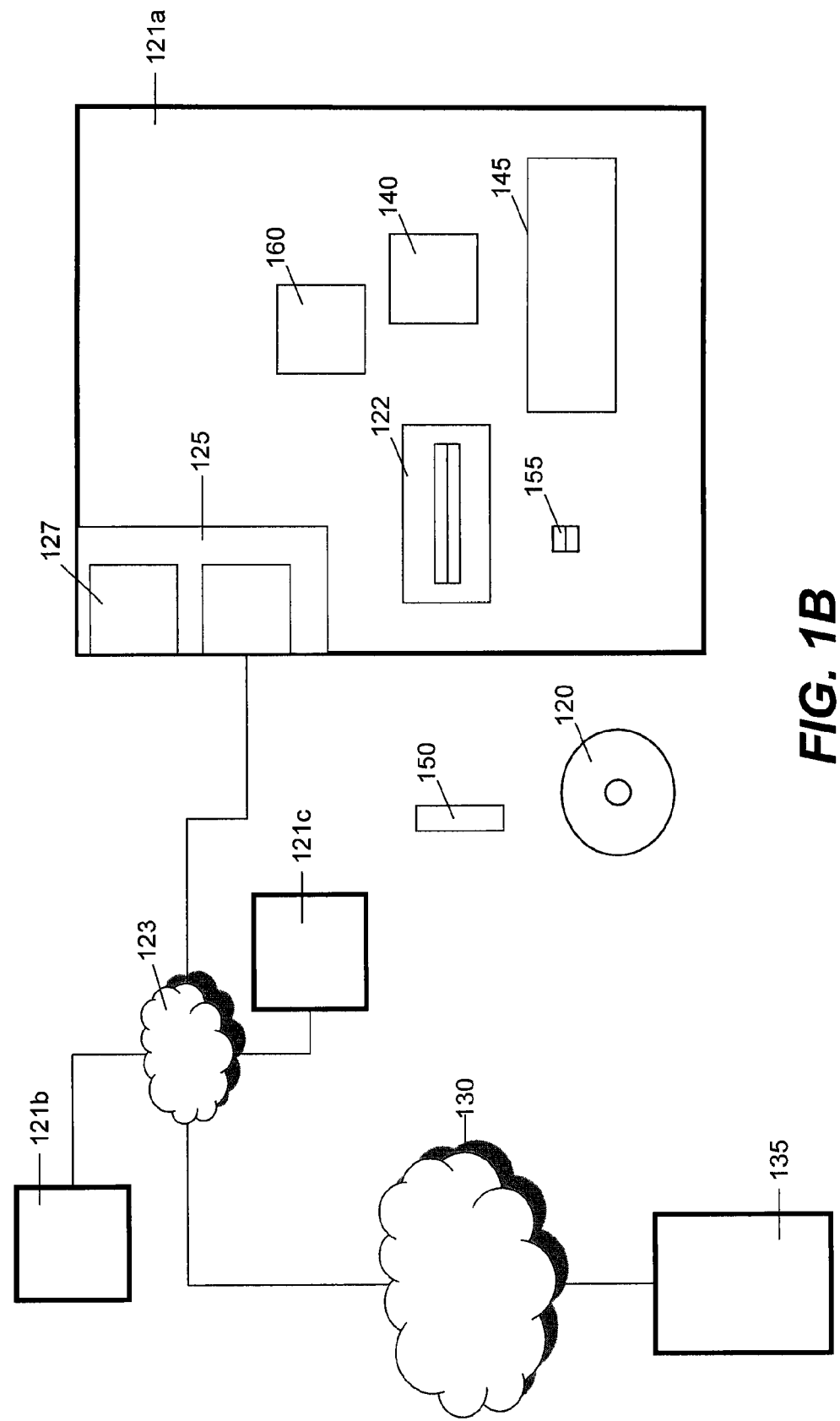
FIG. 1B is a block diagram of a network that includes electronic gaming machines.

In step 110, the encrypted installation data are delivered to a wager gaming machine. Referring to FIG. 1B, in some implementations the delivery process may involve writing the encrypted installation data on a medium and providing the medium to a wager gaming machine. For example, the delivery process may involve writing the encrypted installation data on optical disk 120 and delivering optical disk 120 to a gaming establishment. Optical disk 120 may, for example, be inserted into optical disk drive 122 of wager gaming machine 121*a*.

Alternatively, the delivery process may involve writing the encrypted installation data on another type of medium, such as portable storage device 150, and delivering portable storage device 150 to a gaming establishment. In this example, portable storage device 150 is a solid state memory device configured for communication via a Universal Serial Bus ("USB") interface such as USB interface 155. USB interface 155 may be considered part of interface system 125. However, portable storage device 150 may be any convenient type of portable storage device, such as a portable hard drive, and may be configured for communication via any convenient protocol and/or interface, including wireless communications.

In still other implementations, the delivery process may involve transmitting the encrypted installation data to its destination via local network 123 and/or wide area network ("WAN") 130. Here, local network 123 and WAN 130 are a casino network and the Internet, respectively. (As used herein, the term "casino" may refer to any type of establishment that provides wagering, including but not limited to Las Vegas-type casinos, riverboats, cruise ships, retail establishments having gaming machines, etc.) For example, the delivery process may involve transmitting the encrypted installation data from central system 135 to gaming machine 121*a*, 121*b* and/or 121*c* via WAN 130 and local network 123. In this example, gaming machines 121*a*, 121*b* and 121*c* each have an interface system 125, including at least one network interface that may be configured for communication with local network 123 and/or WAN 130.

During installation, the encrypted installation data may be encrypted to form encrypted storage data for storage in one or more memory devices, such as memory system 145. In this example, memory system 145 includes at least a mass storage device (e.g., a hard drive), random access memory and read-only memory. Logic system 140 may include one or more logic devices such as processors, programmable logic devices, etc. In alternative implementations, the encrypted installation data may be stored in memory system 145. In some implementations, at least a portion of memory system 145 (e.g., a hard drive) may be "write-protected." For example, a password may be required in order to alter the contents of at least a portion of memory system 145.

Although shown as separate boxes in FIG. 1B, logic system 140 preferably includes some type(s) of memory device(s) and memory system 145 preferably includes some type(s) of logic device(s). The installation may be performed by logic system 140, by one or more logic devices associated with memory system 145 and/or by other devices. In some such examples, the memory system 145 may comprise a hard drive that includes a logic system configured for implementing an encryption method.

Preferably, the data are not fully decrypted at any stage of the installation process. In this example, the encrypted installation data are partially decrypted during the installation process. (Step 112.) A storage encryption method is applied to the partially decrypted data to form encrypted storage data. (Step 115.) As described in more detail below, steps 112 and 115 may be part of one process, e.g., as described below with reference to FIGS. 3B and 5B. The encrypted storage data may then be stored on the gaming machine, in memory 145 in this example. (Step 117.)

Figure 2A:
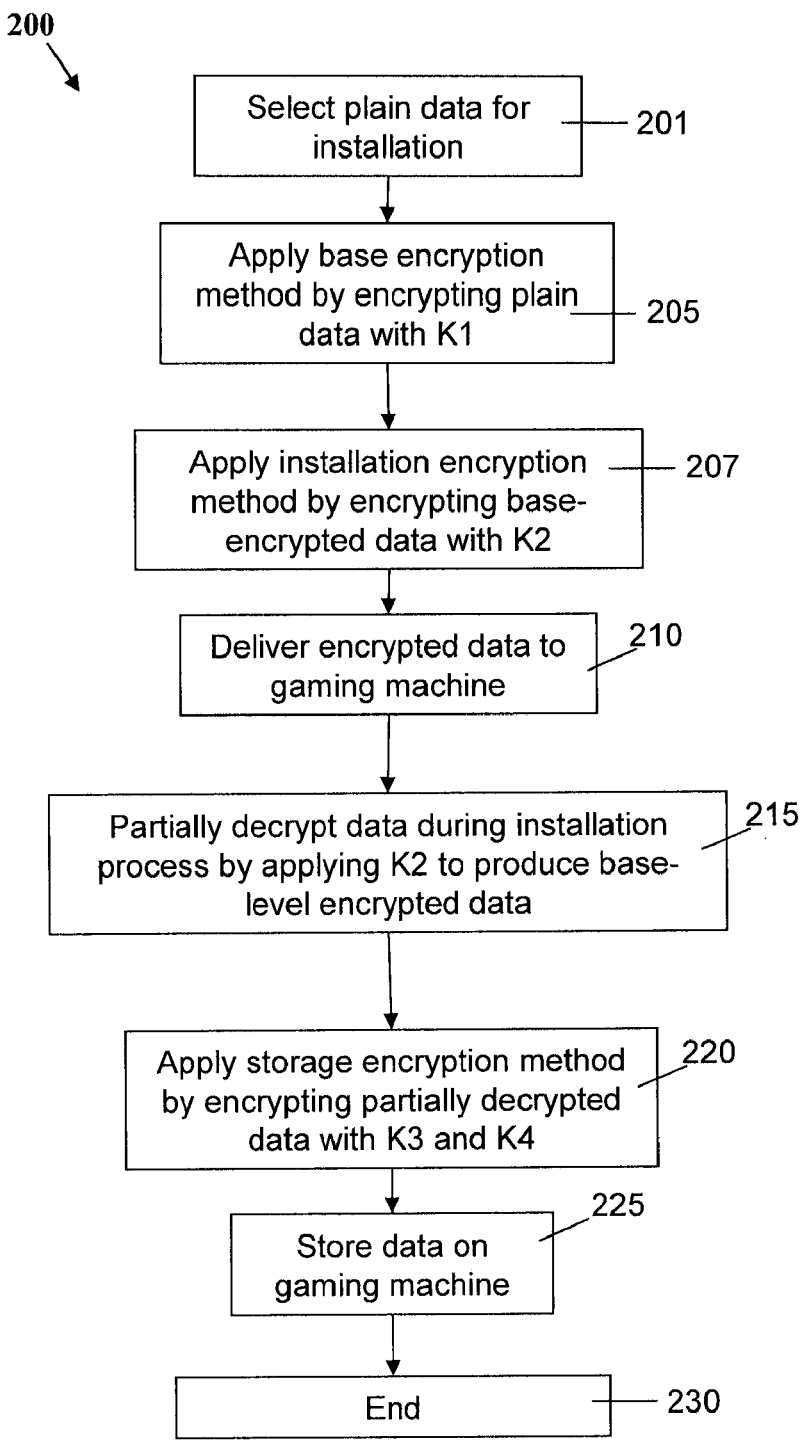
FIG. 2A is flow chart that outlines steps of some methods of the invention.

Flow chart 200 of FIG. 2A outlines the steps of a particular implementation of the general process outlined in flow chart 100. After the plain data are selected (step 210), a base encryption method is applied to the plain data. Here, the plain data are encrypted using a first key, K1. (Step 205.) Accordingly, in this implementation, the base encryption method is a 1-key level of encryption. This step is shown in FIG. 3A, illustrating key K1 being applied to plain data 305.

The base-encrypted data are encrypted according to an installation encryption method. (Step 201.) In this example, the installation encryption method involves using a second encryption key, K2. Accordingly, in this implementation, the installation encryption method is also a 1-key level of encryption. This step is shown in FIG. 3A, illustrating key K2 being applied to the base-encrypted data, thereby forming encrypted installation data 310.

Figure 3A:
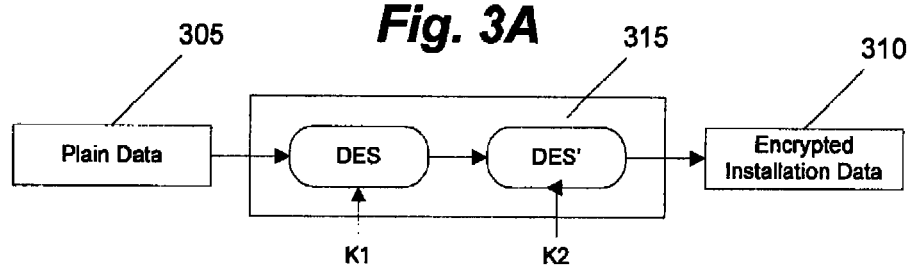
FIG. 3A is a block diagram that illustrates one example of forming encrypted installation data from plain data.

As indicated in FIG. 3A, in some implementations the base encryption method and the installation encryption method may be applied as part of a single process 315, thereby transforming the plain data to encrypted installation data. Process 315 may be implemented, for example, by one or more logic devices executing software, implementing firmware, etc. The logic device(s) may, for example, be disposed in a host device, a server, or another device, e.g., a device of central system 135. (See FIG. 1B.) More details regarding such devices are provided below.

In step 210, the encrypted installation data 310 are delivered to a gaming machine by any convenient process. For example, the encrypted installation data 310 may be written to a storage medium that is shipped to a casino, may be downloaded to a server or other device associated with a casino, may be downloaded directly to a gaming machine, etc.

Figure 3B:
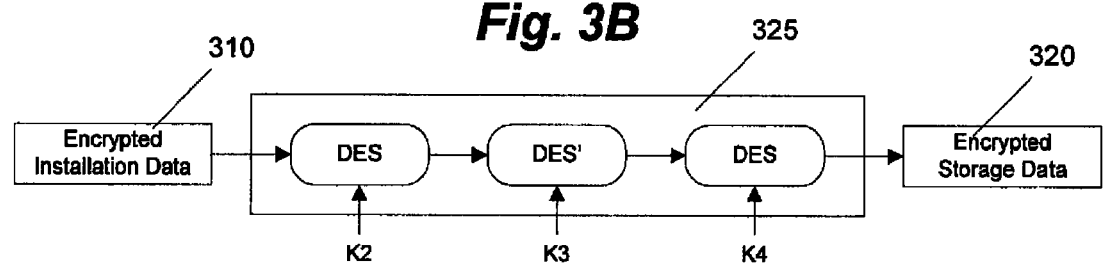
FIG. 3B is a block diagram that illustrates one example of forming encrypted storage data from encrypted installation data.

In step 215, encrypted installation data 310 are partially decrypted. In this example, encrypted installation data 310 are partially decrypted using key K2, as illustrated in FIG. 3B. At this point, the data are encrypted only with the base level of encryption, involving only K1. In step 220, a storage encryption method is applied to the partially-decrypted data, which may then be stored on the gaming machine. (Step 225.) In this example, the data are encrypted using keys K3 and K4 to produce encrypted storage data 320, as illustrated in FIG. 3B. As a result, encrypted storage data 320 are now encrypted with keys K1, K3 and K4.

As shown in FIG. 3B, in some implementations steps 215 and 220 may be part of a single installation process 325. Process 325 may be performed, at least in part, by logic system 140 and/or memory system 145. (See FIG. 1B.)

However, more than one device may be involved in process 325. For example, various implementations involve the provision of at least one key (or the like) for process 325 from a device other than logic system 140 or memory system 145. As described in more detail below, in some such implementations at least one key (or the like) is provided by a portable storage device. The portable storage device providing the key is preferably not the same storage device (if any) on which the encrypted installation data are written.

Moreover, some embodiments provide a logic seal (a/k/a a "tell-tale circuit") such as logic seal 160 of FIG. 1B. Logic seal 160 may, for example, monitor access to at least part of gaming machine 121a, such as logic system 140, memory system 145, one or more access doors, compartments, etc., for indicia of tampering. Preferably, logic seal 160 can monitor access to gaming machine 121a whether gaming machine 121a is powered on or off. Only a small number of bits (e.g., 1) are required to indicate an intrusion, but more bits may be used according to the types of tampering indicia involved.

In some such implementations, one or more encryption/decryption keys may be stored in the logic seal. In some such implementations, a key may be stored in the logic seal that is used to decrypt a larger key that is used, e.g., in a key exchange (such as an RSA key exchange). For example, if sensitive data were sent over local network 123 or WAN 130, some implementations involve negotiating public/private keys. A private key used for downloading games is preferably not stored in a plain form anywhere inside the gaming machine.

When the logic seal is broken or when unauthorized access has otherwise been detected, one or more countermeasures may be taken. For example, at least some data may be deleted: e.g., one or more cryptographic keys may be erased from the logic seal, from logic system 140 and/or memory system 145. Other data may be erased, such as "plain data" that has been unencrypted for use by gaming machine 121a. One or more signals, messages, etc., may be formed and transmitted to one or more other devices, e.g., to a casino system operator's device, to a device in a security system, etc. Some such implementations will be described below with reference to FIG. 7.

In alternative implementations, the base encryption method and/or the installation encryption method may be an key-based encryption method or some other method of encryption. Moreover, the base encryption method may differ from the installation encryption method and/or the storage encryption method. In other words, the base encryption method could be a first type of encryption (e.g., RSA), the installation encryption method could be a second type of encryption (e.g., Data Encryption Standard or "DES") and the storage encryption method could be a third type of encryption (e.g., a Vigenère cipher). (RSA is an algorithm for public-key cryptography. This algorithm was first publicly described by Ron Rivest, Adi Shamir and Leonard Adleman; the letters RSA are the initials of their surnames.) Upon installation, the installation level of encryption may be decrypted (leaving the base level of encryption) and then the storage level of encryption may be applied.

In some preferred embodiments, an Advanced Encryption Standard ("AES") encryption method may be used for one or more of these steps. AES is not only one of the most widely-used algorithms in symmetric key cryptography, but also has been adopted as an encryption standard by the U.S. government. AES was announced by National Institute of Standards and Technology (NIST) as U.S. FIPS PUB 197 (FIPS 197) in Nov. 26, 2001, which is hereby incorporated by reference.

During gaming machine operation, encrypted storage data 320 may be retrieved, decrypted to plain data 305, executed by the gaming machine and encrypted to encrypted storage data 320 after use. Logic system 140 may be involved in some such encryption and/or decryption operations. However, in preferred implementations, at least some encryption and decryption processes may be performed by one or more components of memory system 145, e.g. by a logic system associated with (e.g., incorporated with) a hard drive.

Some such implementations may be performed, at least in part, by one or more logic devices associated with (e.g., made as part of) hard drives that will automatically encrypt all contents given. One example is the Seagate Momentus™ 5400 FDE.2, which uses the AES encryption standard.

Some gaming machines currently implement features of both a serial advanced technology attachment ("SATA") integrated drive electronic ("IDE") technology and a parallel advanced technology attachment ("PATA") IDE technology. In some such implementations, at least some encryption and decryption processes may be performed at a SATA/PATA interface speed. In some preferred implementations, those portions of logic system 140 that are involved in presenting wagering games (e.g., what is sometimes referred to as the "host CPU" or the "master gaming controller") is minimally involved (or not involved) in the encryption/decryption processes.

Figure 2B:
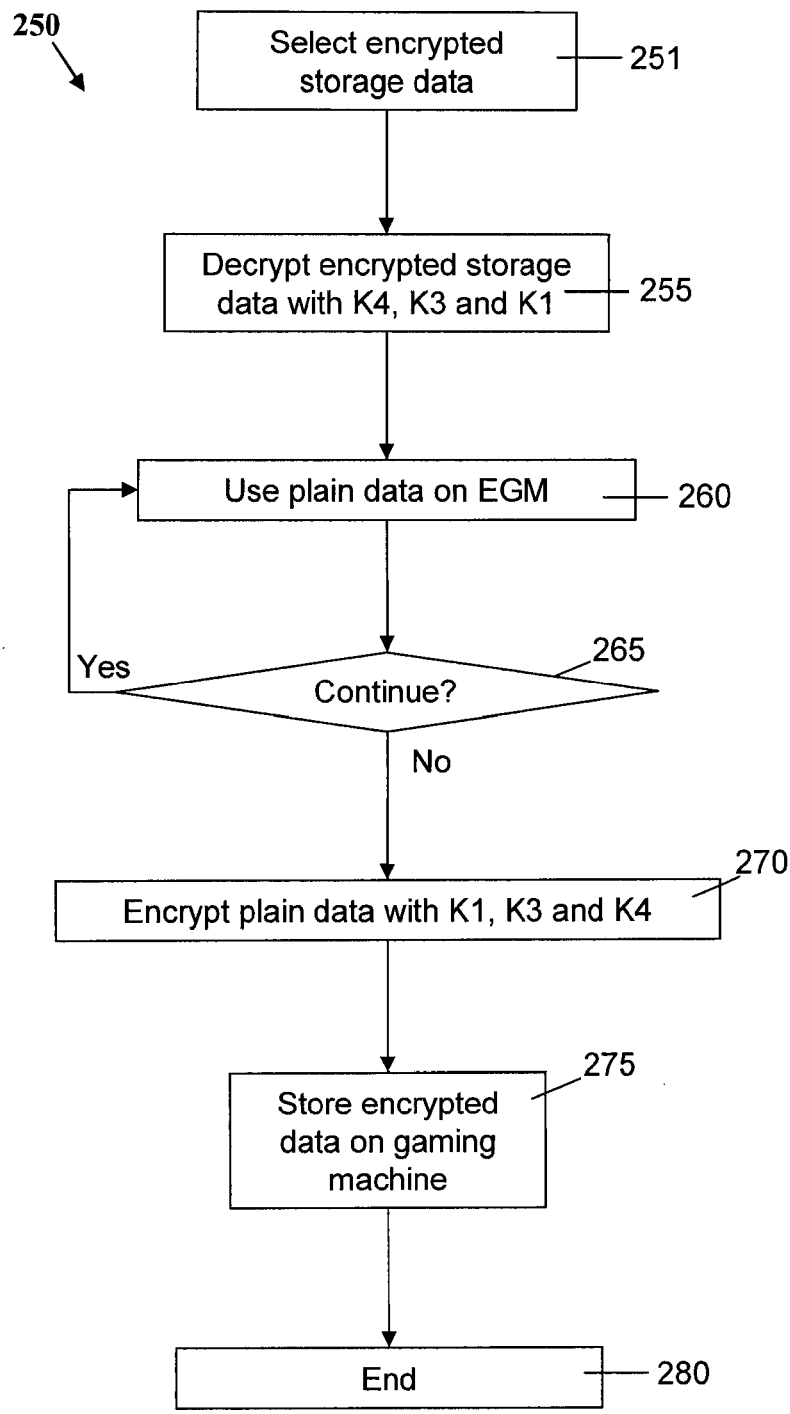
FIG. 2B is flow chart that outlines steps of some alternative methods of the invention.
Figure 3C:
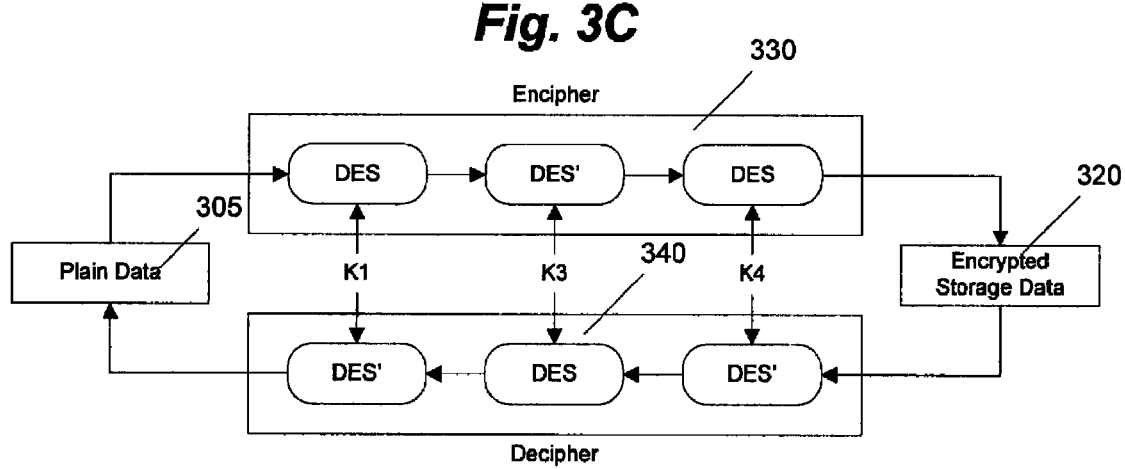
FIG. 3C is a block diagram that illustrates one example of forming encrypted storage data from plain data and vice versa.

One example process is depicted in FIG. 2B. In step 251, encrypted storage data are selected. These data may be selected, for example, in response to an indication from a player, from a device in a casino computer room, etc., that a wagering game has been selected. In step 255, the encrypted storage data are decrypted. In this example (referring now to FIG. 3C), encrypted storage data 320 are decrypted by applying keys K4, K3 and K1, to produce plain data 305 for execution by the gaming machine.

In step 260, the plain data 305 are used by the gaming machine. In step 265, it is determined (e.g., by logic system 140 of FIG. 1B) whether to continue using plain data 305. In some implementations, plain data 305 will be used for a predetermined time, e.g., according to a schedule. In such implementations, step 265 may involve determining whether the predetermined time has elapsed. Step 265 may also involve determining whether logic seal 160 of FIG. 1B has determined that there is some indication of tampering. If so, some data (e.g., plain data 305, one or more encryption keys, etc.) may be deleted. Step 265 may involve determining whether a new wagering game has been selected for presentation on the gaming machine.

When it is determined in step 265 that the plain data 305 will no longer be used by the gaming machine, in step 270 an encryption process 330 is applied to plain data 305 to produce encrypted storage data 320. (See FIG. 3C.) In this example, encryption process 330 involves applying keys K1, K3 and K4 to plain data 305.

Figure 4A:
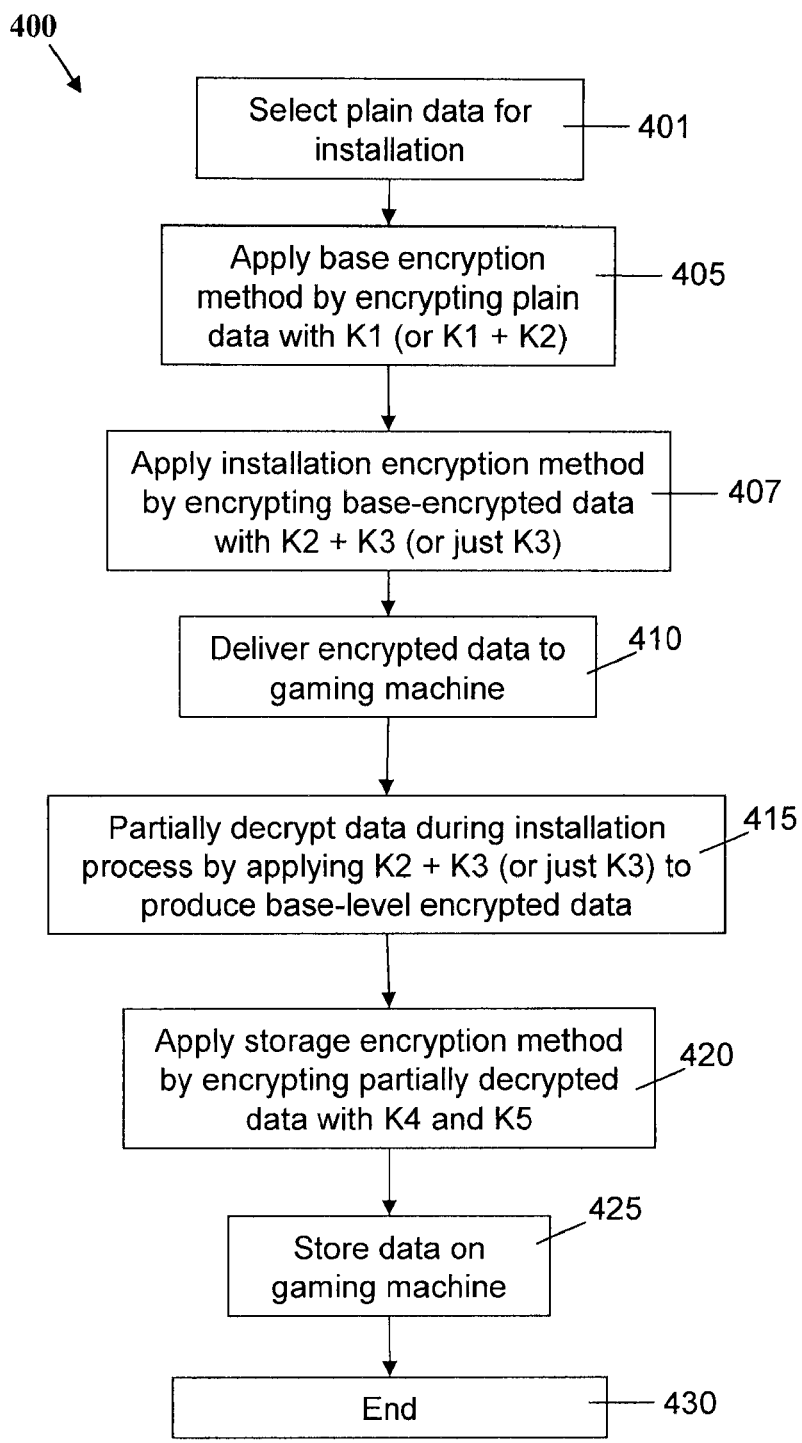
FIG. 4A is flow chart that outlines steps of additional methods of the invention.

Another encryption process 400 is depicted in FIG. 4A. In step 401, plain data are selected for encryption. A base encryption method is applied to the plain data in step 405. In this example, the base encryption method involves encrypting plain data 505 with at least key K1. (See FIG. 5A.) In some implementations, the base encryption method involves encrypting plain data 505 with keys K1 and K2.

Figure 5A:
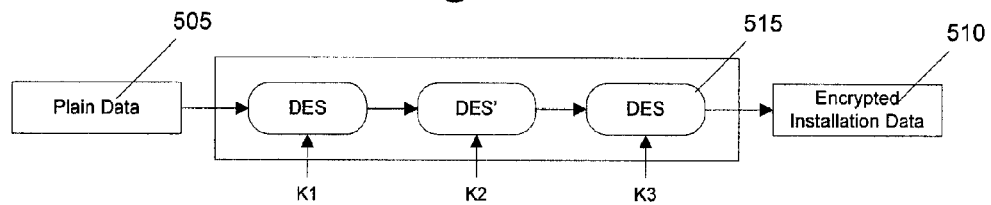
FIG. 5A is a block diagram that illustrates another example of forming encrypted installation data from plain data.

An installation encryption method is then applied. (Step 407.) Here, the installation encryption method involves applying at least K3 to the base-encrypted data. (See FIG. 5A.) If the base encryption method involves encrypting plain data 505 with keys K1 and K2, then the installation encryption method involves applying key K3 to the base-encrypted data. If the base encryption method involves encrypting plain data 505 with only key K1, then the installation encryption method involves applying keys K2 and K3 to the base-encrypted data. The base encryption method and the installation encryption method may be two separate processes or, as shown in FIG. 5A, may be part of one process 515.

Figure 5B:
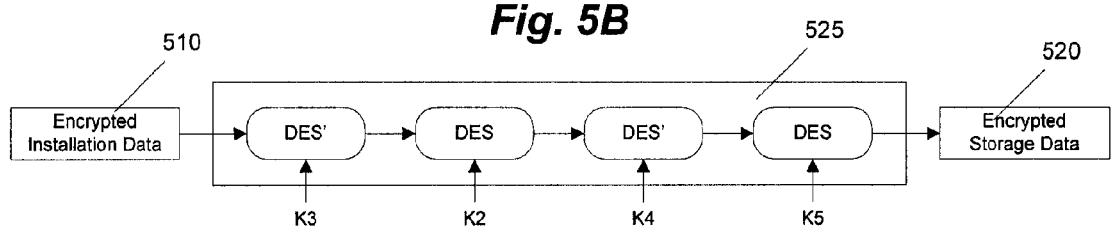
FIG. 5B is a block diagram that illustrates another example of forming encrypted storage data from encrypted installation data.

Referring again to FIG. 4A, in step 410 the encrypted installation data are delivered to a gaming machine by any convenient process, e.g., as described above. In step 415, the encrypted installation data are partially decrypted. In this example, encrypted installation data 510 are partially decrypted using keys K3 and K2, as illustrated in FIG. 5B. After the partial decryption process, the data are encrypted only with the base level of encryption, involving only K1 in this example.

In some implementations, at least some key or keys (such as K2 and/or K3) may be encrypted, e.g., using (at least part of) the gaming machine's storage encryption method. For example, keys K2 and K3 may be encrypted as a data package using keys K1, K4 and K5. In some such implementations, the gaming machine then may retrieve keys K1, K4 and K5 (e.g., by accessing logic seal 160), and use keys K1, K4 and K5 to decrypt keys K2 and K3. In some such implementations, the keys may exist, decrypted, in a volatile memory of the gaming machine.

In step 420, a storage encryption method is applied to the partially-decrypted data, which may then be stored on the gaming machine. (Step 475.) In this example, the data are encrypted using keys K4 and K5 to produce encrypted storage data 520 according to encryption operations 525, as illustrated in FIG. 5B. As a result, encrypted storage data 520 are now encrypted with keys K1, K4 and K5.

Figure 4B:
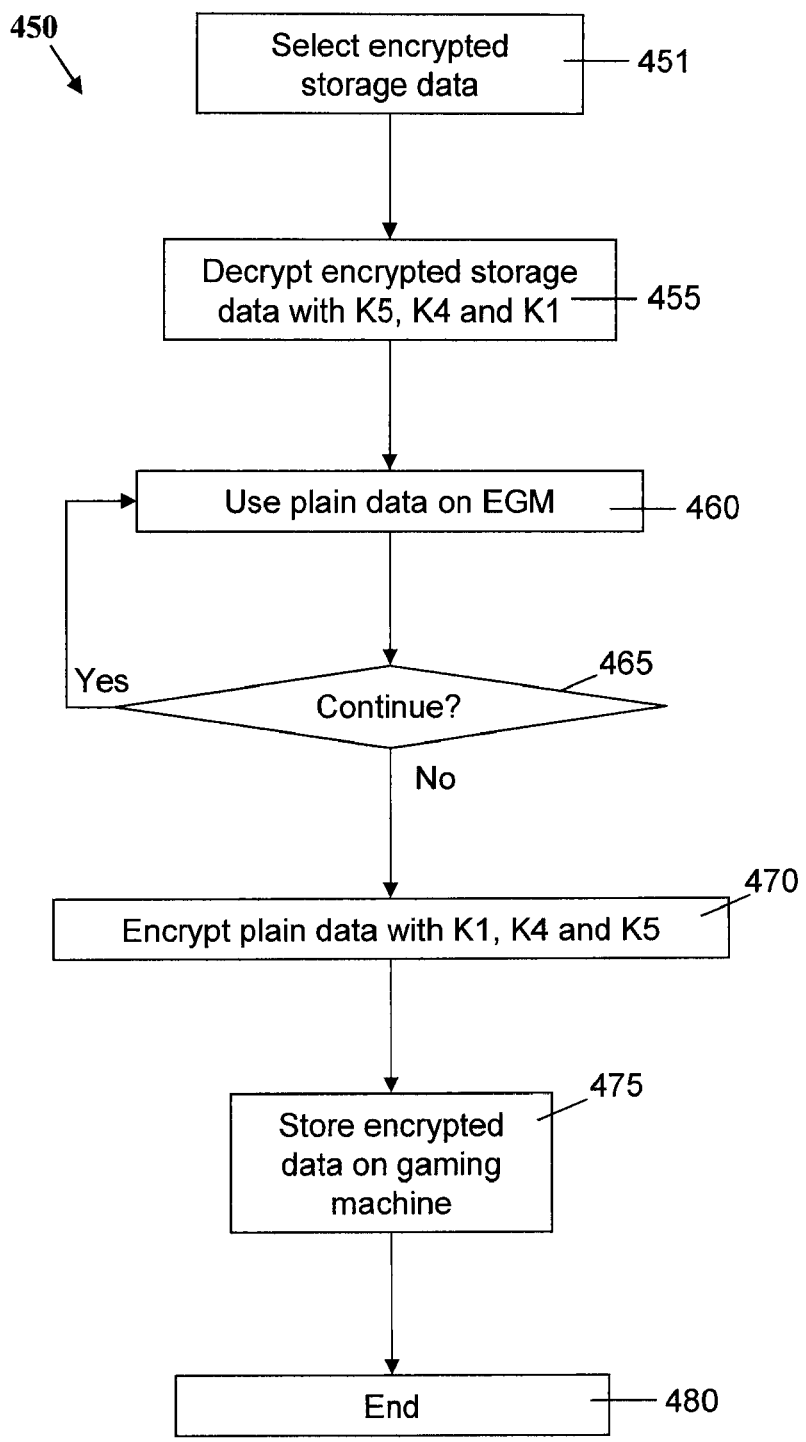
FIG. 4B is flow chart that outlines steps of some alternative methods of the invention.
Figure 5C:
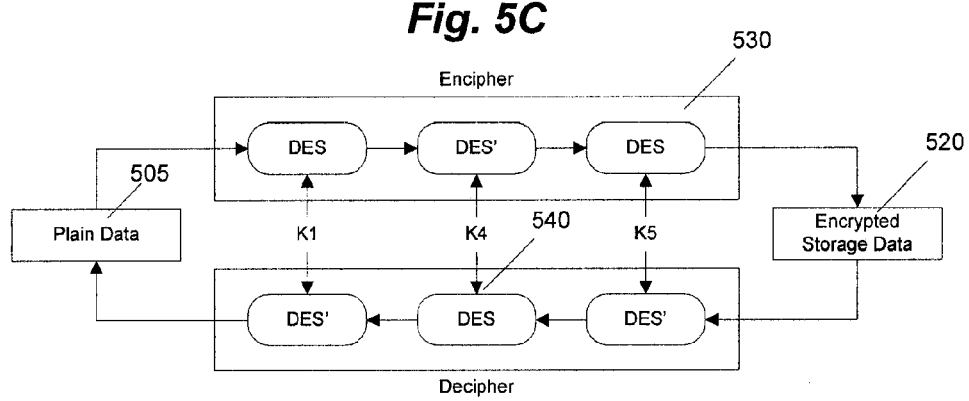
FIG. 5C is a block diagram that illustrates another example of forming encrypted storage data from plain data and vice versa.

A process of encrypting and decrypting the encrypted storage data 520 is depicted in FIG. 4B. In step 451, encrypted storage data are selected and in step 455 the encrypted storage data are decrypted. In this example (referring now to FIG. 5C), encrypted storage data 520 are decrypted by applying keys K5, K4 and K1, to produce plain data 505 for execution by the gaming machine.

In step 460, the plain data 505 are used by the gaming machine. In step 465, it is determined (e.g., by logic system 140 of FIG. 1B) whether to continue using plain data 305. When it is determined in step 465 that the plain data 505 will no longer be used by the gaming machine, in step 470 an encryption process 530 is applied to plain data 505 to produce encrypted storage data 520. (See FIG. 5C.) In this example, encryption process 530 involves applying keys K1, K4 and K5 to plain data 505.

One problem encountered by software and content providers is being able to control the number of copies of such data that are installed, used, etc. A wagering game provider may wish to, e.g., provide an optical disk of software to a casino and only authorize the casino to install the software on a certain number of gaming machines, preferably specified machines. Accordingly, some implementations of the invention allow a casino representative to log on to the game provider's website, pay a license fee and then receive one or more installation keys (or the like).

Figure 6:
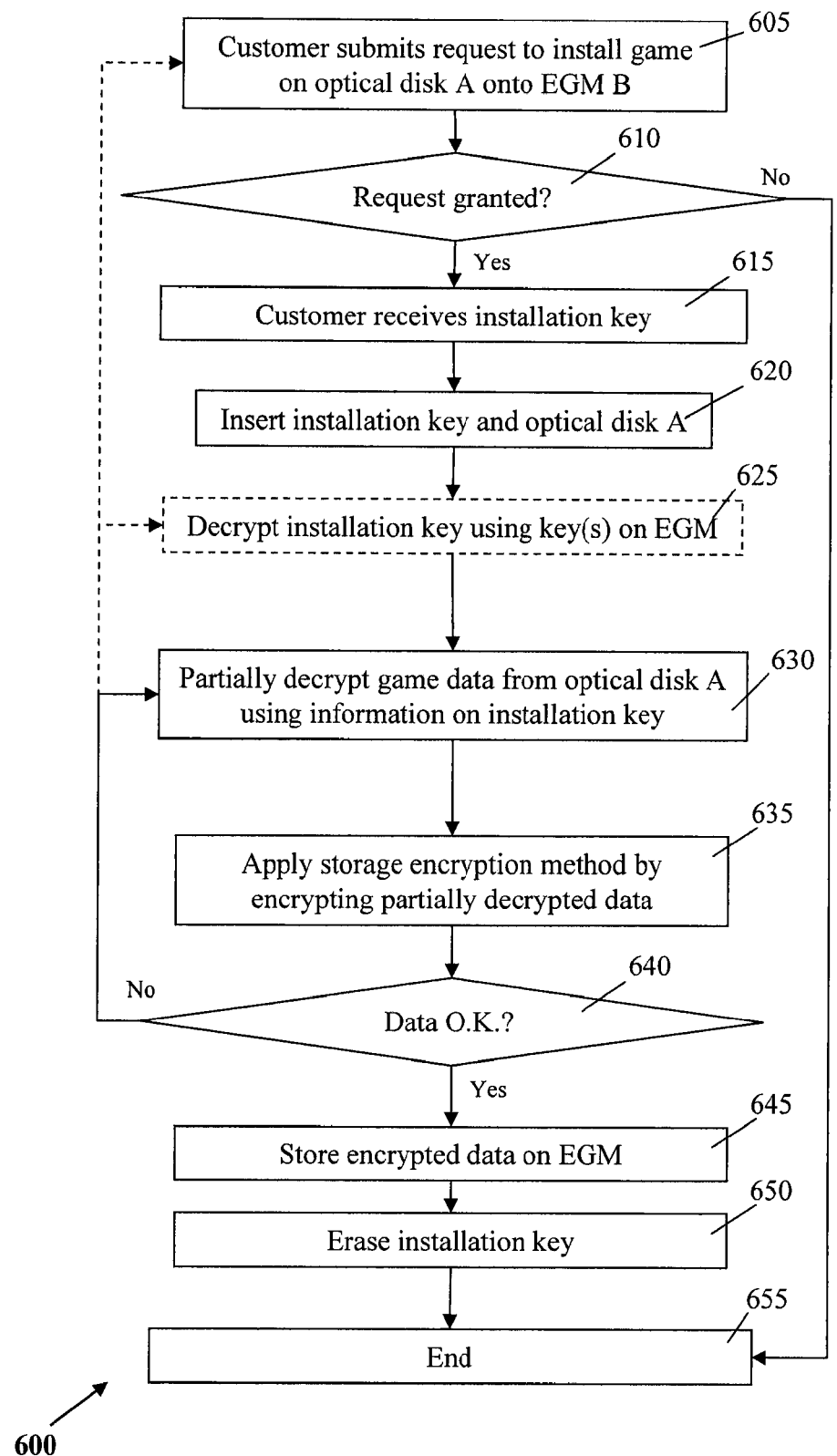
FIG. 6 is a flow chart that outlines additional methods of the invention.

FIG. 6 depicts steps of process 600. This implementation begins when a customer, who is already in possession of optical disk A, submits a request to a central system to install data on optical disk A on a particular wager gaming machine, referred to for convenience as wager gaming machine B. (Step 605.) The customer may be, for example, a representative of a casino. The central system may be, e.g., a wagering game provider. In some such implementations, the request identifies wager gaming machine B, e.g., according to a serial number that uniquely identifies wager gaming machine B, and preferably also identifies optical disk A. The customer preferably identifies himself or herself.

In this example, the request will be granted in step 610 if predetermined criteria are met, e.g., involving the customer's creditworthiness, licensing requirements, jurisdictional rules, determining that wager gaming machine B has been properly identified and is known to be associated with the customer's casino, etc. If the request is granted, the customer will receive information necessary for installing the data on optical disk A on wager gaming machine B. (Step 615.)

In some implementations of the invention, the necessary information will be provided on a portable storage medium configured for communication with wager gaming machine B. In this example, the necessary information is provided in the form of an installation key, a solid state memory device configured for communication via a USB interface such as USB interface 155. (See FIG. 1B.) However, in other implementations, the necessary information may be provided in other forms, e.g., via another type of portable storage device, via another type of interface, via download from central system 135 via WAN 130, local network 123 and interface system 125, etc.

In this example, the solid state memory device has at least one decryption key stored thereon. In some implementations, a casino may be able to use optical disk A to install data on multiple gaming machines. However, the casino may require multiple installation keys, e.g., one installation key for installing the game data on machine 1, a second installation key for installing the game data on machine 2 and so on. In some implementations, the decryption key(s) stored on the installation key may be encrypted.

After the installation key is delivered to the customer (step 615), the installation key and optical disk A are inserted into wager gaming machine B. (Step 620.) Here, the installation key is inserted into USB interface 155 and optical disk A is inserted into optical disk drive 122. If the decryption key(s) stored on the installation key are encrypted, according to some such implementations the decryption key(s) may be decrypted using information stored on the gaming machine. (Step 625.) For example, the decryption key(s) may be decrypted using one or more decryption keys stored in logic seal 160 or memory system 145.

In step 630, the wagering game data on optical disk A are partially decrypted, using information on the installation key, to produce partially decrypted data. In this example, the wagering game data on optical disk A have been encrypted using an M-key encryption method and in step 630 the wagering game data are partially decrypted using N keys from the installation key, where M>N. The resulting data are still partially encrypted according to an M−N key encryption method.

For example, if the wagering game data on optical disk A had been encrypted using a 3-key encryption method (M=3), in step 630 the wagering game data may be partially decrypted using 1 key from the installation key (N=1). In this example, resulting data would still be partially encrypted according to a 2-key encryption method. (M−N=2.) In step 635, a storage encryption method is applied to the partially-decrypted data, producing encrypted storage data.

The encrypted storage data may be evaluated before they are stored in memory system 145 (e.g., on a hard drive). (Step 640.) This evaluation may be performed, for example, by memory system 145 and/or logic system 140. In some implementations, step 640 may involve a check for errors, such as a checksum or another type of redundancy check. Step 640 may also involve an attempt to fully decrypt and execute the wager game data. As with other steps of methods described herein, step 640 may take place at other stages in process 600, such as when optical disk A is inserted into the gaming machine, after an attempt to decrypt the installation key, etc.

Accordingly, if an error is detected in step 640, the response may vary according to, e.g., the type of problem detected. The customer may request a new optical disk and/or a new installation key. (Step 605.) The customer may make another attempt to decrypt the installation key (step 625) and/or may repeat step 630.

If the encrypted storage data appear to be satisfactory, the encrypted storage data are stored in memory system 145 (step 645). In some implementations, the installation key is erased (step 650) before process 600 ends. (Step 655.)

Figure 7:
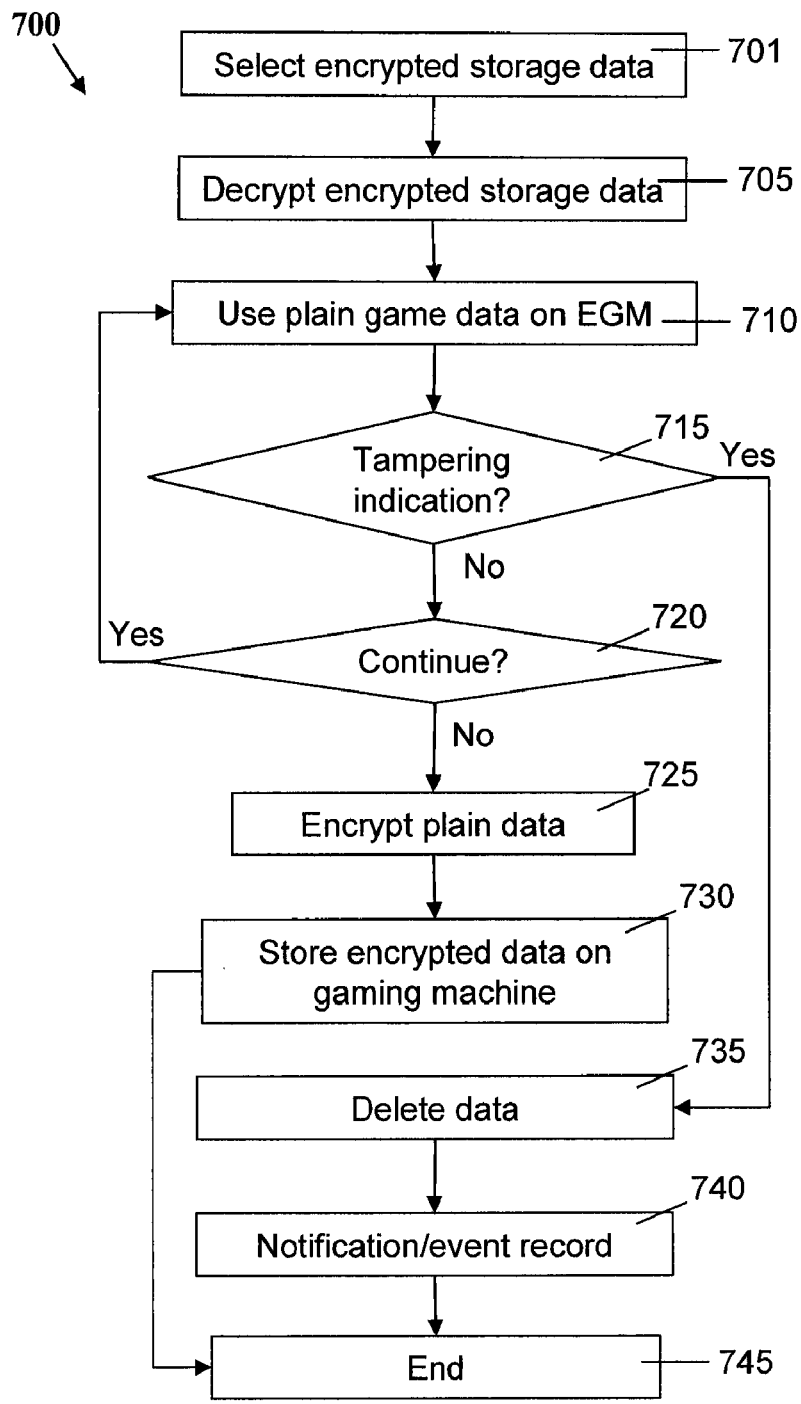
FIG. 7 is a flow chart that outlines other methods of the invention.

FIG. 7 provides one example of a process 700 that may be performed, at least in part, by a logic seal or tell-tale circuit according to some implementations of the invention. Process 700 begins after encrypted storage data have been stored on a wager gaming machine. In step 701, encrypted storage data are selected. In this example, the encrypted storage data comprise encrypted wager gaming data. The selected encrypted storage data are then decrypted to plain data (step 705) and used by the wager gaming machine. (Step 710.) For example, the plain data may comprise software and other data for presenting a wagering game on the wager gaming machine.

These plain data may be used by the gaming machine until some predetermined condition, event, etc., has been determined, e.g., as described above with reference to step 265 of FIG. 2B. (Step 720.) After it is determined in step 720 that the process should no longer continue, the plain data are encrypted (step 725) and stored once again in a mass storage device of the wager gaming machine. (Step 730.) However, if there is a tampering indication (step 715), in this example at least some data may be deleted. (Step 735.) For example, one or more decryption keys needed to decrypt the encrypted storage data may be deleted. In some such implementations, if some encrypted storage data have been decrypted and are currently in the form of plain data, these plain data may be deleted. The tampering indication may, for example, be an indication that an unauthorized person is attempting to access part of the wager gaming machine, that a door of the wager gaming machine has been opened, that an unauthorized device is attempting to communicate with the wager gaming machine, etc.

Preferably, if there has been a tampering indication, a notification is sent to one or more other devices and an event record is made. (Step 740.) For example, logic seal 160 and/or logic system 140 may send one or more messages via interface system 125 to a casino computer room, to a casino floor attendant, to devices in a security system, etc.

Some implementations of the method are particularly useful when encrypted data are provided by downloading. According to some such implementations, a gaming machine provider may ship a machine with a known serial number and a known hard drive serial number. When an encrypted installation takes place, a decryption password may incorporate some or all of the serial number(s).

However, any data may be stored on the gaming machine (e.g., on a hard drive) for this purpose. These data do not need to be, or to involve, the serial number of the hard drive. The data may be a code. A gaming machine provider may indicate that a hard drive of a particular gaming machine has a code stored on it. A password may be required to access the hard drive to obtain this code. The code may need to be decrypted.

Figure 8:
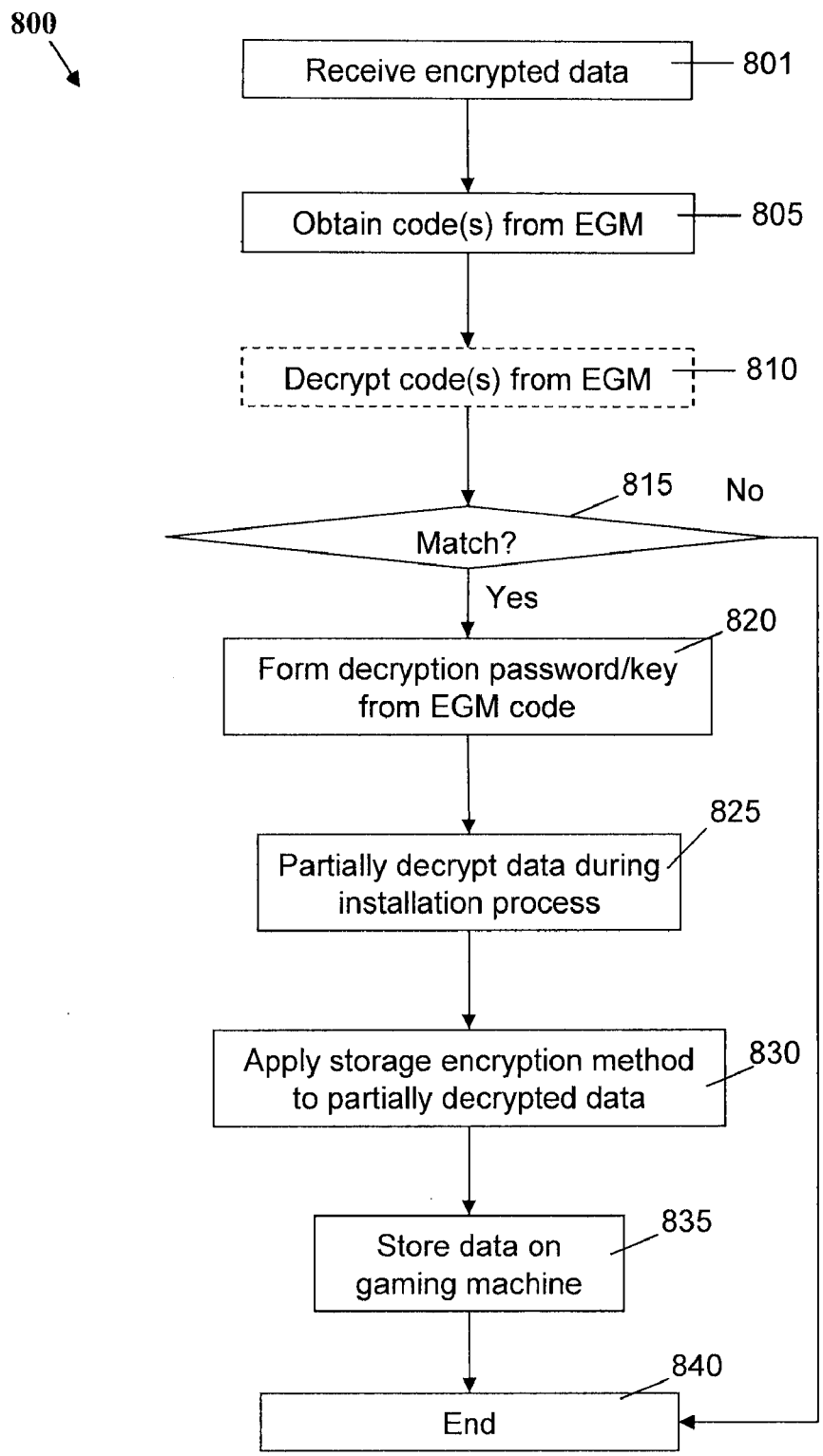
FIG. 8 is a flow chart that outlines yet another method of the invention.

FIG. 8 outlines the steps of one such method 800 of the invention. The steps of method 800 may be performed, at least in part, by logic system 140 and/or memory system 145. (See FIG. 1B.)

Encrypted installation data are received in step 801. In this example, the encrypted installation data are downloaded (e.g., from central system 135 or from a local device) and received via a network interface 127. (See FIG. 1B.) However, in alternative implementations, the encrypted installation data may be received in another fashion, e.g., from a portable storage medium.

In step 805, one or more codes are obtained from the device that received the encrypted installation data. Here, a single code is received from a wager gaming machine. In some such implementations, the code may relate to a serial number or the like, e.g., to a serial number of the wager gaming machine itself, to a serial number of a component, etc. The gaming data for each gaming machine may, for example, be encrypted differently according to known capabilities of particular gaming machines and/or components (e.g. hard drives).

Preferably, the code(s) will be accessible via electronic means only and will not be human-readable, e.g., by inspection of a gaming machine or component. If part or all of a serial number is used in or for a code, the serial number should not be available to anyone who simply opens the machine. However, in alternative implementations, the code or codes are simply stored on the wager gaming machine and do not relate to a device serial number. In some implementations, a code may be stored in memory system 145 (see FIG. 1B), e.g., on the hard drive. A password may be required to obtain the code from memory system 145.

Moreover, in some implementations, the code or codes may be encrypted. For example, the code may be the result of a hash function applied to a device serial number. In another example, the code may be the result of a combination of more than one device serial number according to a predetermined function. If the code or codes are encrypted, they may be decrypted in step 810.

In step 815 it is determined whether the code is a proper code. For example, the code obtained in step 805 (or the result of a decryption operation in step 810) may be transmitted from the gaming machine to central system 135 and compared to a code expected to be associated with the gaming machine.

In some implementations, the code may be used to form a password that is required for installation of the data. A device of the central system may receive the bits that represent the decryption password, alter these bits in a predetermined manner and supply the result to the gaming machine. For example, the device of the central system may alter the received bits by performing an exclusive "or" ("XOR") operation with, e.g., the serial number of the hard drive believed to be associated with the gaming machine.

When the gaming machine receives the encrypted password, the gaming machine may obtain the serial number of the hard drive (by querying the hard drive for its serial number, if necessary) and then alter the password it receives by XOR'ing with the same serial number. This will undo the prior XOR operation and decrypt the password. If the gaming machine has the wrong serial number, is a bogus gaming machine, has the wrong kind of hard drive, etc., the gaming machine will not be able to decrypt the data received in step 801. It will be appreciated that operations other than XOR may be used. In alternative implementations, for example, the lower byte of the decryption password may be taken from a device serial number.

If the code comprises part or all of a device serial number (e.g. of a hard drive and/or of the gaming machine itself), the serial number may be evaluated to determine whether it is the serial number of a device expected to be deployed in the gaming machine. In some such examples, step 815 involves a determination of whether a device (such as a hard drive) that will be involved in the encryption/decryption process has the necessary capabilities.

In some implementations, a gaming machine provider may have made an arrangement with a hard drive manufacturer to configure the hard drives in a particular fashion, to use predetermined serial numbers, etc., at the time the hard drive is being manufactured. Alternatively, a gaming machine provider may configure a hard drive according to the invention. For example, the gaming machine provider may receive a hard drive having a known serial number and encryption capability, remove the serial number from the exterior of the hard drive (e.g., remove a sticker indicating the serial number), store an encrypted serial number on the hard drive and assign an encryption password for encrypting the contents of the hard drive.

A software installation module (e.g., of the central system) may evaluate the serial number and determine whether or not the hard drive was purchased through a particular gaming machine provider. If not, the central system may disallow installation. If these serial numbers are logged in a central database, the serial numbers may be used to determine the gaming machine/hard drive key. For example, the serial number may be the key. The serial number may occupy some predetermined bits in the key. Alternatively, the serial number may be used to seed a deterministic algorithm (such as an RNG, CRC or hash) that will produce the same serial number every time, given the same key. Some such processes use a one-way hash, so that it may not be possible for a hacker to work backwards and derive the required serial number from the desired key.

Returning now to the example shown in FIG. 8, if it is determined in step 815 that the code is the proper code, an encryption and/or decryption password, key, or the like may be formed from the code. (Step 820.) In this example, a decryption key is formed from the code, which is used to partially decrypt the encrypted installation data received in step 801. (Step 825.) A storage encryption method may be applied to the partially-decrypted data, thereby producing encrypted storage data (step 830) that may be stored on the gaming machine. (Step 835.)

If it is determined in step 815 that the code is improper, various steps may follow. For example, a casino operator may be given another opportunity to obtain and/or decrypt the code. Alternatively, new encrypted installation data may be downloaded, e.g., encrypted installation data that could be used by a device having the indicated code. If step 815 involves an assessment of a component expected to be in the gaming machine and the component is not found, the casino may be notified. If there appears to be a serious problem (e.g., with a number of gaming machines not having expected components), a representative associated with central system 135 may make an investigation.

Some networks described herein provide methods and devices for managing one or more networked gaming establishments. Such networks may sometimes be referred to herein as server-based gaming networks, sb™ networks, or the like. Some such gaming networks described herein allow for the convenient provisioning of networked gaming machines and other devices relevant to casino operations. Game themes may be easily and conveniently added or changed, if desired. Related software, including but not limited to player tracking software, peripheral software, etc., may be downloaded to networked gaming machines and other devices, such as kiosks, networked gaming tables, player stations, etc.

Relevant information is set forth in U.S. patent application Ser. No. 11/225,407, by Wolf et al., entitled "METHODS AND DEVICES FOR MANAGING GAMING NETWORKS" and filed Sep. 12, 2005, in U.S. patent application Ser. No. 10/757,609 by Nelson et al., entitled "METHODS AND APPARATUS FOR GAMING DATA DOWNLOADING" and filed on Jan. 14, 2004, in U.S. patent application Ser. No. 10/938,293 by Benbrahim et al., entitled "METHODS AND APPARATUS FOR DATA COMMUNICATION IN A GAMING SYSTEM" and filed on Sep. 10, 2004, in U.S. patent application Ser. No. 11/225,337 by Nguyen et al., filed Sep. 12, 2005 and entitled "DISTRIBUTED GAME SERVICES," in U.S. patent application Ser. No. 11/225,408 by Kinsley et al., entitled "METHODS AND DEVICES FOR AUTHENTICATION AND LICENSING IN A GAMING NETWORK" and filed Aug. 1, 2005, in U.S. patent application Ser. No. 11/078,966 by Nguyen et al., filed Mar. 10, 2005 and entitled "SECURED VIRTUAL NETWORK IN A GAMING ENVIRONMENT," in U.S. patent application Ser. No. 11/173,442 by Kinsley et al., filed Jul. 1, 2005 and entitled "METHODS AND DEVICES FOR DOWNLOADING GAMES OF CHANCE" and in U.S. patent application Ser. No. 11/810,888 by Graham et al., filed Jun. 6, 2007 and entitled "DATABASE QUERIES WITHIN A GAMING MACHINE," all of which are hereby incorporated by reference in their entirety and for all purposes.

Some such networks include devices that provide functionality relating to the present invention. For example, encrypted installation data (or the like) may be provided to networked devices, including but not limited to gaming machines, kiosks, gaming tables, etc. Local and/or central servers (and/or other devices) may be configured for related functionality, such as encryption/decryption functionality, licensing functionality, accounting functionality, etc.

Figure 9:
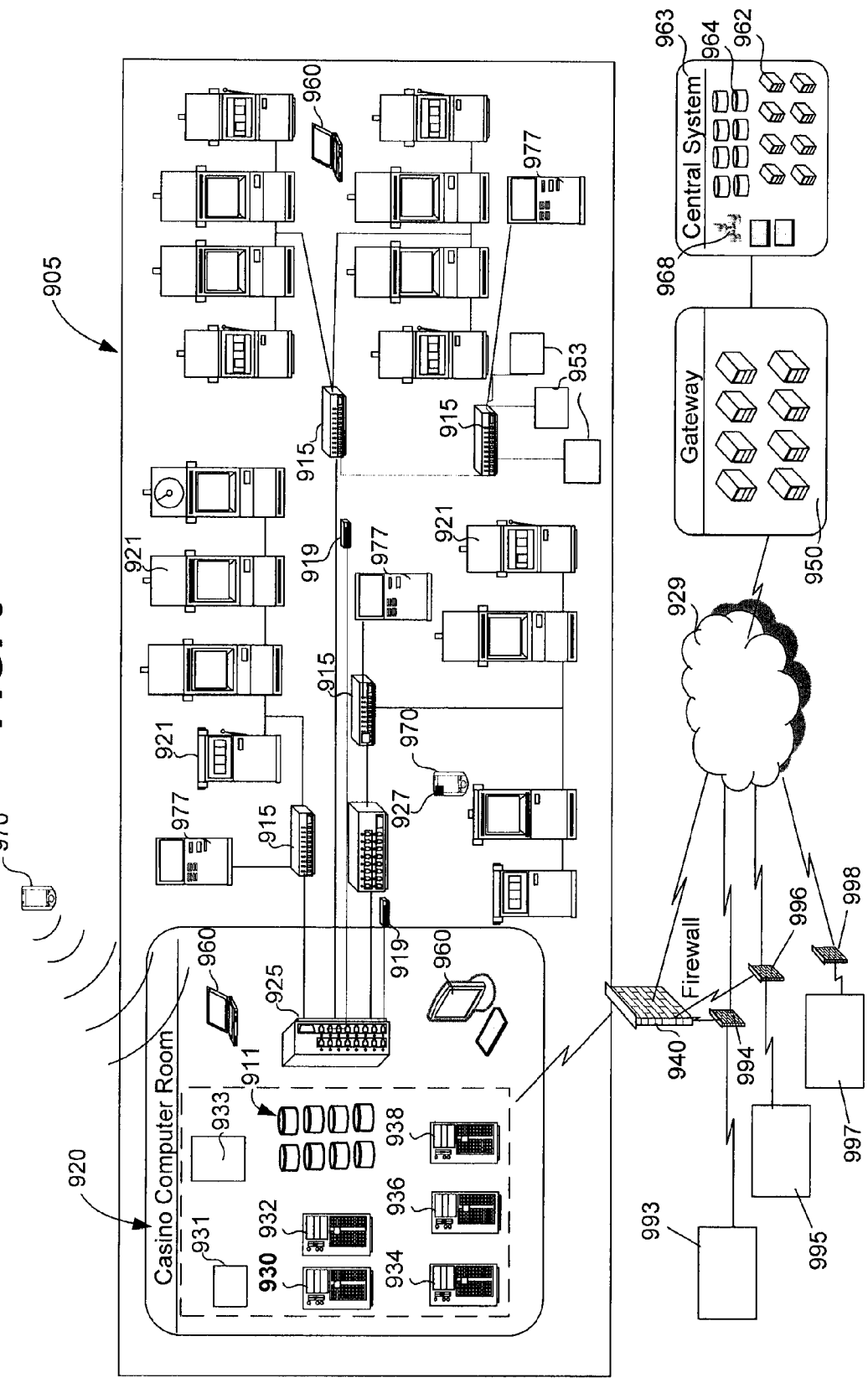
FIG. 9 illustrates a gaming network that may be used for some implementations of the invention.

One example of an sb™ network is depicted in FIG. 9. Those of skill in the art will realize that this architecture and the related functionality are merely examples and that the present invention encompasses many other such embodiments and methods. Moreover, other devices that may be used in connection with the present invention do not appear in FIG. 9. For example, a network for implementing the present invention would preferably include a plurality of networked cameras, such as video cameras, smart cameras, digital still cameras, etc., such as those described above with reference to FIGS. 1A through 1D. Moreover, a network for implementing the present invention may also include various RFID readers, RFID switches, middleware servers, etc.

Here, casino computer room 920 and networked devices of a gaming establishment 905 are illustrated. Gaming establishment 905 is configured for communication with central system 963 via gateway 950. Gaming establishments 993 and 995 are also configured for communication with central system 963.

In some implementations, gaming establishments may be configured for communication with one another. In this example, gaming establishments 993 and 995 are configured for communication with casino computer room 920. Such a configuration may allow devices and/or operators in casino 905 to communicate with and/or control devices in other casinos. In some such implementations, a server in computer room 920 may control devices in casino 905 and devices in other gaming establishments. Conversely, devices and/or operators in another gaming establishment may communicate with and/or control devices in casino 905.

For example, a server of casino 905 or central system 963 may be provisioned with relatively more advanced software (e.g., 3-D facial recognition software) for patron identification than servers of other networked locations. Such a server may process patron identification requests from devices in casino 905 as well as patron identification requests from devices in gaming establishments 993 and 995.

Here, gaming establishment 997 is configured for communication with central system 963, but is not configured for communication with other gaming establishments. Some gaming establishments (not shown) may not be in communication with other gaming establishments or with a central system.

Gaming establishment 905 includes multiple gaming machines 921, each of which is part of a bank of gaming machines 921. In this example, gaming establishment 905 also includes a bank of networked gaming tables 953. However, the present invention may be implemented in gaming establishments having any number of gaming machines, gaming tables, etc. It will be appreciated that many gaming establishments include hundreds or even thousands of gaming machines 921 and/or gaming tables 953, not all of which are necessarily included in a bank and some of which may not be connected to a network.

Some gaming networks provide features for gaming tables that are similar to those provided for gaming machines, including but not limited to bonusing, player loyalty/player tracking and the use of cashless instruments. Relevant material is provided in U.S. patent application Ser. No. 11/154,833, entitled "CASHLESS INSTRUMENT BASED TABLE GAME PROMOTIONAL SYSTEM AND METHODOLOGY" and filed on Jun. 15, 2005, U.S. Provisional Patent Application No. 60/858,046, entitled "AUTOMATED PLAYER DATA COLLECTION SYSTEM FOR TABLE GAME ENVIRONMENTS" and filed on Nov. 10, 2006, U.S. patent application Ser. No. 11/129,702, entitled "WIDE AREA TABLE GAMING MONITOR AND CONTROL SYSTEM" and filed on May 15, 2005, U.S. patent application Ser. No. 11/425,998 entitled "PROGRESSIVE TABLE GAME BONUSING SYSTEMS AND METHODS", filed Jun. 22, 2006 and U.S. patent application Ser. No. 11/225,299, entitled "UNIVERSAL CASINO BONUSING SYSTEMS AND METHODS" and filed on Sep. 12, 2005, all of which are incorporated herein by reference. Accordingly, software related to such features may be provided and/or controlled, and related data may be obtained and/or provided, according to the present invention.

Some configurations can provide automated, multi-player roulette, blackjack, baccarat, and other table games. The table games may be conducted by a dealer and/or by using some form of automation, which may include an automated roulette wheel, an electronic representation of a dealer, etc. In some such implementations, devices such as cameras, radio frequency identification devices, etc., may be used to identify and/or track playing cards, chips, etc. Some of gaming tables 953 may be configured for communication with individual player terminals (not shown), which may be configured to accept bets, present an electronic representation of a dealer, indicate game outcomes, etc.

Some gaming networks include electronically configurable tables for playing table games. U.S. patent application Ser. No. 11/517,861, entitled "CASINO DISPLAY METHODS AND DEVICES" and filed on Sep. 7, 2006, describes some such tables and is hereby incorporated by reference. An operator may select a desired game, such as a poker game or a blackjack game, and the table will be automatically configured with geometrical patterns, text, etc., which are appropriate for the desired table game. The desired type of table game may be selected by a control on the table itself or according to instructions received from, e.g., a server or a casino manager via a network interface.

Gaming establishment 905 also includes networked kiosks 977. Depending on the implementation, kiosks 977 may be used for various purposes, including but not limited to cashing out, prize redemption, redeeming points from a player loyalty program, redeeming "cashless" indicia such as bonus tickets, smart cards, etc. In some implementations, kiosks 977 may be used for obtaining information about the gaming establishment, e.g., regarding scheduled events (such as tournaments, entertainment, etc.), regarding a patron's location, etc. Software related to such features may be provided and/or controlled, and related data may be obtained and/or provided, according to the present invention.

In this example, each bank has a corresponding switch 915, which may be a conventional bank switch in some implementations. Each switch 915 is configured for communication with one or more devices in computer room 920 via main network device 925, which combines switching and routing functionality in this example. Although various communication protocols may be used, some preferred implementations use the Gaming Standards Association's G2S Message Protocol. Other implementations may use IGT's open, Ethernet-based SuperSAS® protocol, which IGT makes available for downloading without charge. Still other protocols, including but not limited to Best of Breed ("BOB"), may be used to implement various aspects of the invention. IGT has also developed a gaming-industry-specific transport layer called CASH that rides on top of TCP/IP and offers additional functionality and security.

Here, gaming establishment 905 also includes an RFID network, implemented in part by RFID switches 919 and multiple RFID readers (not shown). An RFID network may be used, for example, to track objects (such as mobile gaming devices), patrons, etc., in the vicinity of gaming establishment 905. Some examples of how an RFID network may be used in a gaming establishment are set forth in U.S. patent application Ser. No. 11/655,496, entitled "DYNAMIC CASINO TRACKING AND OPTIMIZATION" and filed on Jan. 19, 2007 and in U.S. patent application Ser. No. 11/599,241, entitled "DOWNLOADING UPON THE OCCURRENCE OF PREDETERMINED EVENTS" and filed on Nov. 13, 2006, both of which are hereby incorporated by reference.

As noted elsewhere herein, some implementations of the invention may involve "smart" player loyalty instruments, such as player tracking cards, that include an RFID tag. Accordingly, the location of such RFID-enabled player loyalty instruments may be tracked via the RFID network. In this example, at least some of mobile devices 970 may include an RFID tag 927, which includes encoded identification information for the mobile device 970. Accordingly, the locations of such tagged mobile devices 970 may be tracked via the RFID network in gaming establishment 905. Other location-detection devices and systems, such as the global positioning system ("GPS"), may be used to monitor the location of people and/or devices in the vicinity of gaming establishment 905 or elsewhere.

Various alternative network topologies can be used to implement different aspects of the invention and/or to accommodate varying numbers of networked devices. For example, gaming establishments with large numbers of gaming machines 921 may require multiple instances of some network devices (e.g., of main network device 925, which combines switching and routing functionality in this example) and/or the inclusion of other network devices not shown in FIG. 9. Some implementations of the invention may include one or more middleware servers disposed between kiosks 977, RFID switches 919 and/or bank switches 915 and one or more devices in computer room 920 (e.g., a corresponding server). Such middleware servers can provide various useful functions, including but not limited to the filtering and/or aggregation of data received from switches, from individual gaming machines and from other devices. Some implementations of the invention include load-balancing methods and devices for managing network traffic.

Storage devices 911, sb™ server 930, License Manager 931, Arbiter 933, servers 932, 934, 936 and 938, host device(s) 960 and main network device 925 are disposed within computer room 920 of gaming establishment 905. In practice, more or fewer devices may be used. Depending on the implementation, some such devices may reside in gaming establishment 905 or elsewhere.

One or more devices in central system 963 may also be configured to perform, at least in part, tasks specific to the present invention. For example, one or more servers 962, storage devices 964 and/or host devices 968 of central system 963 may be configured to implement the functions described in detail elsewhere herein. These functions may include, but are not limited to, collecting data from devices (such as cameras, RFID readers, EGMs, cash registers, host devices, mobile devices, etc.), evaluating such data for defined events, determining which patrons may require heightened levels of data gathering and/or service, adding descriptions to audio-visual data associated with such patrons, etc. One or more of the servers of computer room 920 may be configured with software for camera control, patron identification, patron tracking, event detection and/or making responses to detected events.

These servers may be configured for communication with other devices in or outside of gaming establishment 905, such as host devices 960 and mobile devices 970, for implementing some methods described elsewhere herein. Host devices 960 and mobile devices 970, some of which may be associated with computer room 920, may be used to provide the graphical user interfaces and related functionality described above, e.g., with reference to FIGS. 3A through 3G.

Some of these servers may be configured to perform tasks relating to accounting, player loyalty, bonusing/progressives, configuration of gaming machines, etc. One or more such devices may be used to implement a casino management system, such as the IGT Advantage™ Casino System suite of applications, which provides instantaneous information that may be used for decision-making by casino managers. A Radius server and/or a DHCP server may also be configured for communication with the gaming network. Some implementations of the invention provide one or more of these servers in the form of blade servers.

Some preferred embodiments of sb™ server 930 and the other servers shown in FIG. 9 include (or are at least in communication with) clustered CPUs, redundant storage devices, including backup storage devices, switches, etc. Such storage devices may include a "RAID" (originally redundant array of inexpensive disks, now also known as redundant array of independent disks) array, back-up hard drives and/or tape drives, etc.

In some implementations of the invention, many of these devices (including but not limited to License Manager 931, servers 932, 934, 936 and 938, and main network device 925) are mounted in a single rack with sb™ server 930. Accordingly, many or all such devices will sometimes be referenced in the aggregate as an "sb™ server." However, in alternative implementations, one or more of these devices is in communication with sb™ server 930 and/or other devices of the network but located elsewhere. For example, some of the devices could be mounted in separate racks within computer room 920 or located elsewhere on the network. Moreover, it can be advantageous to store large volumes of data elsewhere via a storage area network ("SAN").

Computer room 920 may include one or more operator consoles or other host devices that are configured for communication with other devices within and outside of computer room 920. Such host devices may be provided with software, hardware and/or firmware for implementing various aspects of the invention. However, such host devices need not be located within computer room 920. Wired host devices 960 (which are desktop and laptop computers in this example) and wireless devices 970 (which are PDAs in this example) may be located elsewhere in gaming establishment 905 or at a remote location.

Some embodiments of the invention include devices for implementing access control, security and/or other functions relating to the communication between different devices on the network. In this example, arbiter 933 serves as an intermediary between different devices on the network. Arbiter 933 may be implemented, for example, via software that is running on a server or another networked device. Some implementations of Arbiter 933 are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference and for all purposes. In some preferred implementations, Arbiter 933 is a repository for the configuration information required for communication between devices on the gaming network (and, in some implementations, devices outside the gaming network). Although Arbiter 933 can be implemented in various ways, one exemplary implementation is discussed in the following paragraphs.

Figure 10:
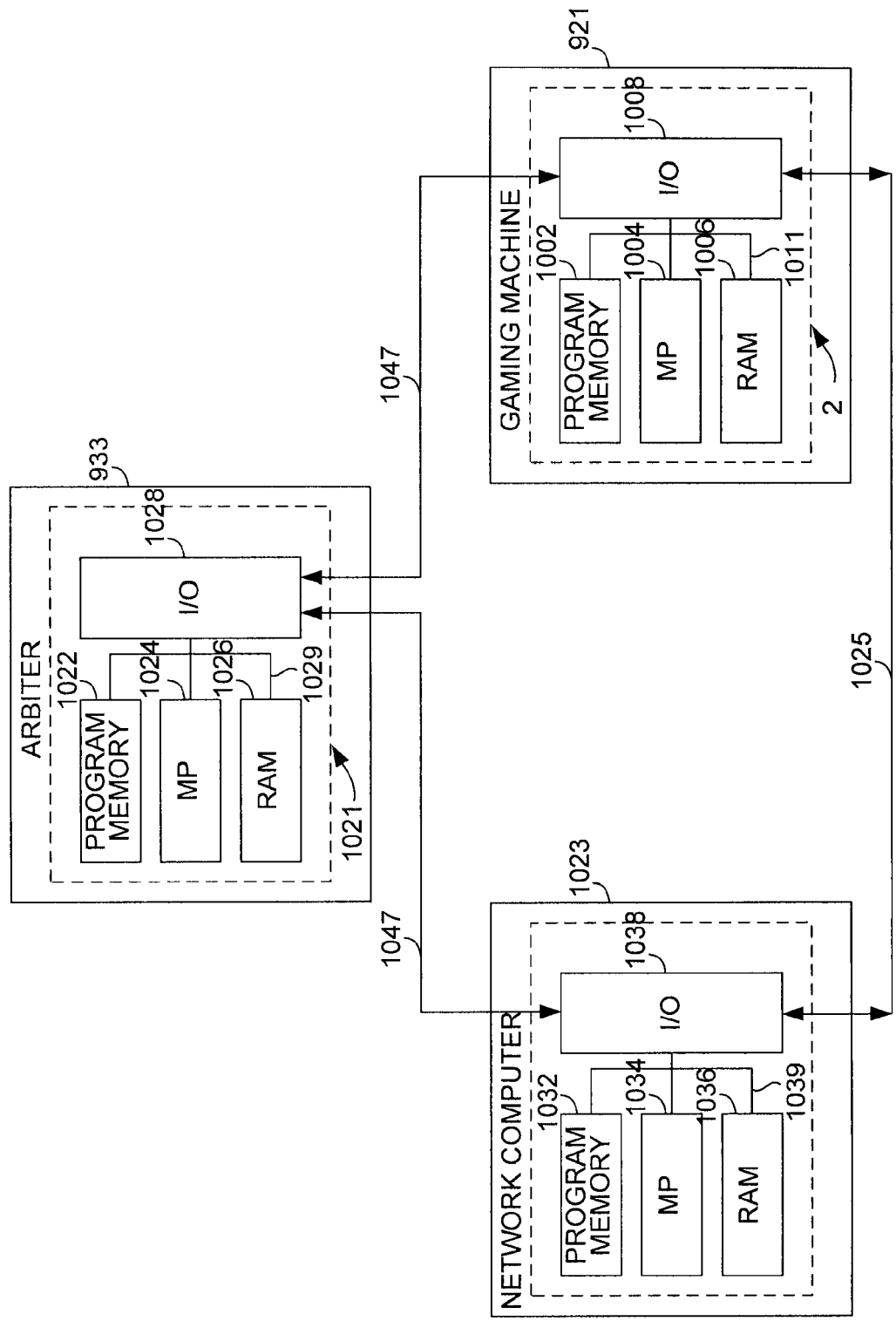
FIG. 10 is a block diagram of an Arbiter and other devices that may be used for some implementations of the invention.

FIG. 10 is a block diagram of a simplified communication topology between gaming machine 921, network computer 1023 and Arbiter 933. Network computer 1023 may be, for example, a server or other device within computer room 920 or elsewhere. Although only one gaming machine 921, one network computer 1023 and one Arbiter 933 are shown in FIG. 10, it should be understood that the following examples may be applicable to different types of networked devices in addition to gaming machine 921 and network computer 1023, and may include different numbers of network computers 1023, Arbiters 933 and gaming machines 921. For example, a single Arbiter 933 may be used for secure communications among a plurality of network computers 1023 and tens, hundreds or thousands of gaming machines 921. Likewise, multiple Arbiters 933 may be utilized for improved performance and other scalability factors.

Referring to FIG. 10, the Arbiter 933 may include an arbiter controller 1021 that may comprise a program memory 1022, a microcontroller or microprocessor (MP) 1024, a random-access memory (RAM) 1026 and an input/output (I/O) circuit 1028, all of which may be interconnected via an address/data bus 1029. The network computer 1023 may also include a controller 1031 that may comprise a program memory 1032, a microcontroller or microprocessor (MP) 1034, a random-access memory (RAM) 1036 and an input/output (I/O) circuit 1038, all of which may be interconnected via an address/data bus 1039. It should be appreciated that although the Arbiter 933 and the network computer 1023 are each shown with only one microprocessor 1024, 1034, the controllers 1021, 1031 may each include multiple microprocessors 1024, 1034. Similarly, the memory of the controllers 1021, 1031 may include multiple RAMs 1026, 1036 and multiple program memories 1022, 1032. Although the I/O circuits 1028, 1038 are each shown as a single block, it should be appreciated that the I/O circuits 1028, 1038 may include a number of different types of I/O circuits. The RAMs 1024, 1034 and program memories 1022, 1032 may be implemented as semiconductor memories, magnetically readable memories, and/or optically readable memories, for example.

As shown in FIG. 10, the gaming machine 921 may be operatively coupled to the network computer 1023 via the data link 1025. The gaming machine 921 may also be operatively coupled to the Arbiter 933 via the data link 1049, and the network computer 1023 may likewise be operatively coupled to the Arbiter 933 via the data link 1047. Gaming machine 921 may also include a program memory 1002, microprocessor (MP) 1006, random-access memory (RAM) 1011, and input/output (I/O) circuit 1008.

As shown in FIG. 10, the gaming machine 921 may be operatively coupled to the network computer 1023 via the data link 1025. The gaming machine 921 may also be operatively coupled to the Arbiter 933 via the data link 1049, and the network computer 1023 may likewise be operatively coupled to the Arbiter 933 via the data link 1047.

Communications between the gaming machine 921 and the network computer 1023 may involve different information types of varying levels of sensitivity resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, etc.), download information (e.g., game and/or peripheral software, licensing information, etc.) and personal information (e.g., social security number, personal preferences, etc.) may be encrypted with stronger encryption techniques such as DES, 3DES or AES to provide increased security.

As disclosed in further detail in the Arbiter Application, the Arbiter 933 may verify the authenticity of devices in the gaming network, including but not limited to devices sending queries and/or remote procedure calls to gaming machines. The Arbiter 933 may receive a request for a communication session from a network device. For ease of explanation, the requesting network device may be referred to as the client, and the requested network device may be referred to as the host. The client may be any device on the network and the request may be for a communication session with any other network device. The client may specify the host, or the gaming security arbiter may select the host based on the request and based on information about the client and potential hosts. The Arbiter 933 may provide encryption keys (session keys) for the communication session to the client via the secure communication channel. Either the host and/or the session key may be provided in response to the request, or may have been previously provided. The client may contact the host to initiate the communication session. The host may then contact the Arbiter 933 to determine the authenticity of the client. The Arbiter 933 may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, the Arbiter 933 may contact the host regarding the request and provide corresponding session keys to both the client and the host. The Arbiter 933 may then initiate either the client or the host to begin their communication session. In turn, the client and host may begin the communication session directly with each other using the session keys to encrypt and decrypt messages. An additional explanation of the communication request, communication response and key distribution is provided in the Arbiter Application.

Referring again to FIG. 9, the communication link(s) between casino 905 and central system 963 preferably have ample bandwidth and may, for example, comprise one or more T1 or T3 connections and/or satellite links having comparable bandwidth, etc. Network 929 is the Internet in this example. However, it will be understood by those of skill in the art that network 929 could include any one of various types of networks, such as the public switched telephone network ("PSTN"), a satellite network, a wireless network, a metro optical transport, etc. Accordingly, a variety of protocols may be used for communication on network 929, such as Internet Protocol ("IP"), Fibre Channel ("FC"), FC over IP ("FCIP"), Internet SCSI ("iSCSI," an IP-based standard for linking data storage devices over a network and transferring data by carrying SCSI commands over IP networks) or Dense Wavelength Division Multiplexing ("DWDM," an optical technology used to increase bandwidth over existing fiber optic backbones).

If a host device is located in a remote location, security methods and devices 940, 994, 996, and 998 (such as firewalls, authentication and/or encryption) should be deployed in order to prevent the unauthorized access of the gaming network.

Similarly, any other connection between gaming network 905 and the outside world should only be made with trusted devices via a secure link, e.g., via a virtual private network ("VPN") tunnel. For example, the illustrated connection between sb™ server 930, gateway 950 and central system 963 (that may be used for communications involving peripheral device software downloads, etc.) is advantageously made via a VPN tunnel. Details of VPN methods that may be used with the present invention are described in the reference, "Virtual Private Networks-Technologies and Solutions," by R. Yueh and T. Strayer, Addison-Wesley, 2001, ISBN#0-201-70209-6, which is incorporated herein by reference and for all purposes. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols, including RFC reports, may be obtained from the VPN Consortium, an industry trade group (http://www.vpnc.com, VPNC, Santa Cruz, Calif.).

Alternatively, a permanent virtual circuit ("PVC") can be established to provide a dedicated and secure circuit link between two facilities, e.g., between a casino and central system 963. A PVC is a virtual circuit established for repeated use between the same data terminals. A PVC could be provided, for example, via AT&T's Asynchronous Transfer Mode ("ATM") switching fabric. Some implementations provide a dedicated line from an endpoint (e.g., from casino 905) into the ATM backbone. Other implementations provide a connection over another network (e.g., the Internet) between an endpoint and the nearest device of the ATM backbone, e.g., to the nearest edge router. In some such implementations, the fixed-sized cells used in the ATM switching fabric may be encapsulated in variable sized packets (such as Internet Protocol or Ethernet packets) for transmission to and from the ATM backbone.

For security purposes, information transmitted to, on or from a gaming establishment may be encrypted. In one implementation, the information may be symmetrically encrypted using a symmetric encryption key, where the symmetric encryption key is asymmetrically encrypted using a private key. The public key may, for example, be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10,000 faster than asymmetric encryption algorithms.

Some network implementations may use Trusted Network Connect ("TNC"), which is an open architecture provided by the Trusted Network Connect Sub Group ("TNC-SG") of the Trusted Computing Group (TCG). TNC enables network operators to provide endpoint integrity at every network connection, thus enabling interoperability among multi-vendor network endpoints. Alternatively, or additionally, the Secure Internet File Transfer ("SIFT") may be employed. SIFT allows devices to send and receive data over the Internet in a secure (128-bit encryption) method of transport.

Providing secure connections between devices in a gaming network, such as the connections between the local devices of the gaming network 905 and central system 963, allows for the deployment of many advantageous features. For example, a customer (e.g., an employee of a gaming establishment) may be able to log onto an account of central system 963 to obtain the account information such as the customer's current and prior account status. Automatic updates of a customer's software may also be enabled. For example, central system 963 may notify one or more devices in gaming establishment 905 regarding new products and/or product updates. For example, central system 963 may notify server (or other device) in computer room 920 regarding new software, software updates, the status of current software licenses, etc. Alternatively, such updates could be automatically provided to a server in computer room 920 and downloaded to networked gaming machines.

After the local server receives this information, relevant products of interest may be identified (by the server, by another device or by a human being). If an update or a new software product is desired, it can be downloaded from the central system. Similarly, a customer may choose to renew a software license via a secure connection with central system 963, e.g., in response to a notification that the software license is required.

In addition, providing secure connections between different gaming establishments can enable alternative implementations of the invention. For example, a number of gaming establishments may be owned and/or controlled by the same entity. In such situations, having secure communications between gaming establishments makes it possible for a gaming entity to use one or more servers in a gaming establishment as an interface between central system 963 and gaming machines in multiple gaming establishments. For example, new or updated software may be obtained by a server in one gaming establishment and distributed to gaming machines in that gaming establishment and/or other gaming establishments. A server in one gaming establishment may perform services, such as patron identification services, in response to a request from a device in another gaming establishment.

Figure 11:
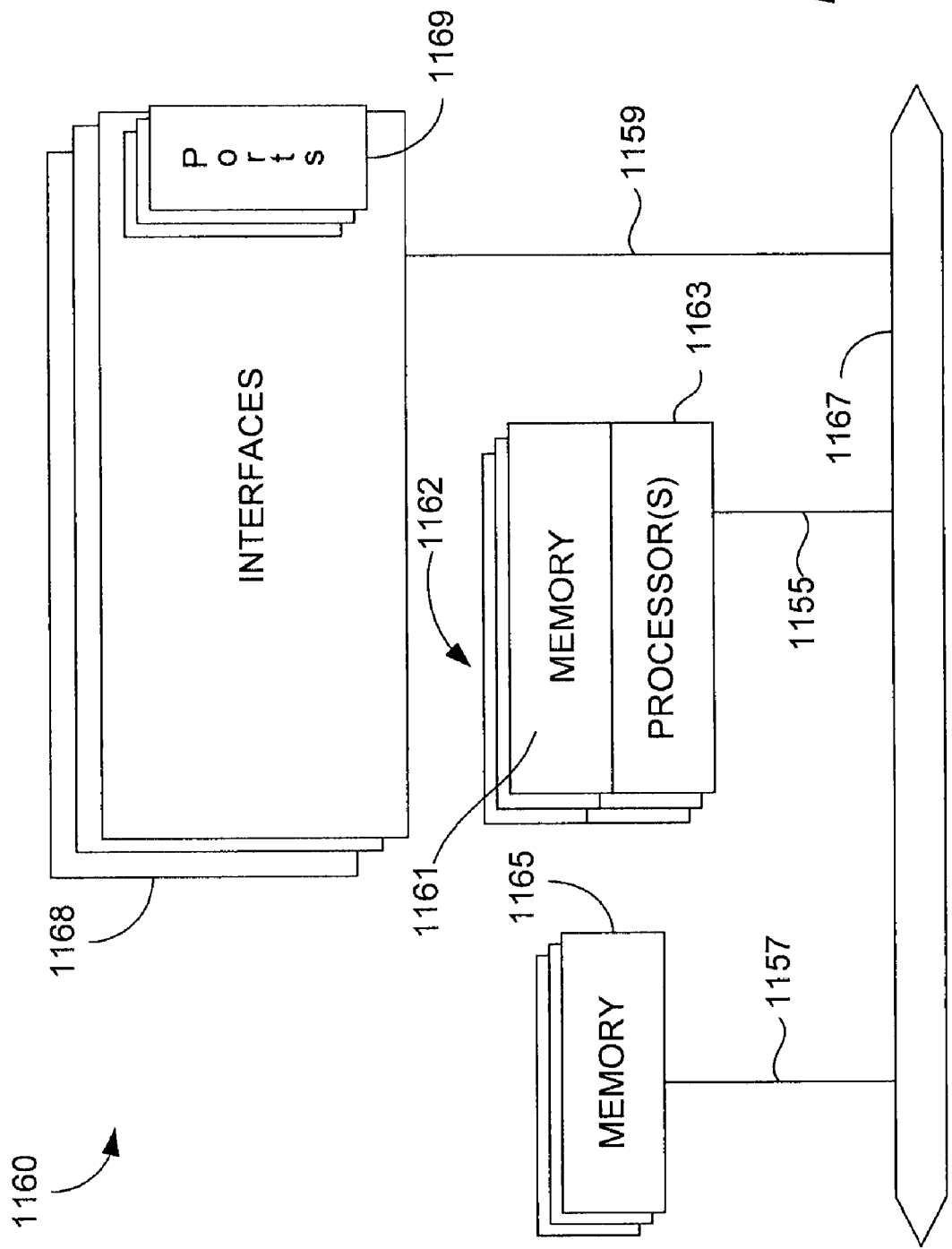
FIG. 11 is a diagram of a server that may be configured according to some implementations of the invention.

FIG. 11 illustrates an example of a network device that may be configured for implementing some methods of the present invention. Network device 1160 includes a master central processing unit (CPU) 1162, interfaces 1168, and buses 1155, 1157, 1159, and 1167 (e.g., a PCI bus). Generally, interfaces 1168 include ports 1169 appropriate for communication with the appropriate media. In some embodiments, one or more of interfaces 1168 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1168 control such communications-intensive tasks as encryption, decryption, compression, decompression, packetization, media control and management. By providing separate processors for the communications-intensive tasks, interfaces 1168 allow the master microprocessor 1162 efficiently to perform other functions such as routing computations, network diagnostics, security functions, etc.

The interfaces 1168 are typically provided as interface cards (sometimes referred to as "linecards"). Generally, interfaces 1168 control the sending and receiving of data packets over the network and sometimes support other peripherals used with the network device 1160. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1162 may be responsible for implementing specific functions associated with the functions of a desired network device. According to some embodiments, CPU 1162 accomplishes all these functions under the control of software including an operating system and any appropriate applications software.

CPU 1162 may include one or more processors 1163 such as a processor from the Motorola family of microprocessors or the MIPS family of microprocessors. In an alternative embodiment, processor 1163 is specially designed hardware for controlling the operations of network device 1160. In a specific embodiment, a memory 1161 (such as non-volatile RAM and/or ROM) also forms part of CPU 1162. However, there are many different ways in which memory could be coupled to the system. Memory block 1161 may be used for a variety of purposes such as, for example, caching and/or storing data, programming instructions, etc.

Regardless of network device's configuration, it may employ one or more memories or memory modules (such as, for example, memory block 1165) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 11 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 11) or switch fabric based (such as a cross-bar).

While this invention is described in terms of preferred embodiments, there are alterations, permutations, and equivalents that fall within the scope of the invention. It should also be noted that there are many alternative ways of implementing the present invention. It is therefore intended that the invention not be limited to the preferred embodiments described herein, but instead that the invention should be interpreted as including all such alterations, permutations, and equivalents as fall within the true spirit and scope of the present invention.

Encryption methods described herein (such as the base encryption method, the installation encryption method and the storage encryption method) may sometimes be referred to in a numerical fashion, e.g., as "a first encryption method, a "second encryption method," etc., in the claims. However, the numerical indications do not necessarily correspond to a sequence of operations. For example, a "fourth encryption method" (or the like) that is recited in the claims may, in some instances, be performed prior to a third encryption method.

We claim:

1. A gaming machine, comprising:
an interface system comprising at least one device configured for receiving data;
a memory system comprising at least one memory; and
a logic system comprising at least one logic device, the logic system configured to do the following:
  receive first encrypted data from the interface system during installation of wager gaming software on the gaming machine, the first encrypted data formed by encrypting the wager gaming software via at least a first encryption operation and a second encryption operation;
  perform a first decryption operation on the first encrypted data to produce partially decrypted data;
  perform a third encryption operation on the partially decrypted data to produce second encrypted data, the second encrypted data including the wager gaming software encrypted by at least the first encryption operation and the third encryption operation, wherein the wager gaming software is not fully decrypted at any time during the installation of the wager gaming software on the gaming machine; and
  fully decrypt the second encrypted data in response to receiving a request to execute the wager gaming software.

2. The gaming machine of claim 1, wherein the logic system is further configured to delete, after performing the first decryption operation, first decryption data for performing the first decryption operation.

3. The gaming machine of claim 1, wherein the memory system comprises a hard drive and wherein at least a portion of the logic system is disposed within the hard drive.

4. The gaming machine of claim 1, wherein the logic system is associated with the memory.

5. The gaming machine of claim 1, wherein the interface system comprises a device configured for receiving data from a portable storage medium.

6. The gaming machine of claim 1, wherein the interface system comprises at least one network interface.

7. The gaming machine of claim 1,
wherein second decryption data for performing the second decryption operation and third decryption data for performing the third decryption operation are stored in the memory system,
wherein the gaming machine further comprises a device integrity system configured to detect device tampering and to provide a device tampering indication to the logic system, and
wherein the gaming machine is further configured to delete at least one of the second decryption data or the third decryption data upon receiving the device tampering indication.

8. The gaming machine of claim 1, wherein second decryption data for performing the second decryption operation and third decryption data for performing the third decryption operation are stored in the memory system and wherein the logic system is further configured to do the following:
retrieve the second encrypted data;
retrieve the second decryption data and the third decryption data; and
decrypt the second encrypted data with the second decryption data and the third decryption data, thereby producing the unencrypted data.

9. The gaming machine of claim 1, wherein the first encrypted data are formed by encrypting the wager gaming software via the first encryption operation, the second encryption operation and a fourth encryption operation.

10. The gaming machine of claim 1, wherein the logic system comprises a gaming controller configured for executing decrypted software, wherein the gaming controller is not involved in performing encryption or decryption.

11. The gaming machine of claim 1, wherein the logic system is further configured to store the second encrypted data in the memory system.

12. The gaming machine of claim 5, wherein the interface system comprises at least one of a Universal Serial Bus ("USB") interface or an optical disk drive.

13. The gaming machine of claim 5, wherein the logic system is further configured to receive first decryption data for performing the first decryption operation from the portable storage medium.

14. The gaming machine of claim 7, wherein at least one of the logic system or the device integrity system is configured to delete decryption data upon receiving the device tampering indication.

15. The gaming machine of claim 7, wherein the device integrity system comprises a tell-tale circuit.

16. The gaming machine of claim 9, wherein the logic system is further configured to perform a second decryption operation on the partially decrypted data to undo the fourth encryption operation and to produce third encrypted data.

17. A gaming machine, comprising:
a memory system;
an interface system; and
a logic system configured to:
provide wagering games;
receive, via the interface system, first encrypted data formed by encrypting wager gaming software with at least first and second encryption keys;
receive, via the interface system, the second encryption key;
decrypt the first encrypted data with the second encryption key to produce base encrypted data, wherein the base encrypted data is encrypted with at least the first encryption key;
delete the second encryption key;
store third and fourth encryption keys in the memory system;
encrypt the base encrypted data with the third and fourth encryption keys to produce second encrypted data, wherein the second encrypted data is encrypted with at least the first, third, and fourth encryption keys to create encrypted wager gaming software encrypted with at least the first, third, and fourth encryption keys; and
store the encrypted wager gaming software in the memory system.

18. The gaming machine of claim 17, further configured to:
receive an indication of gaming machine tampering; and
delete at least one of the third and fourth encryption keys.

19. The gaming machine of claim 17, wherein the first encrypted data is received at the interface system via a portable storage medium having the first encrypted data stored thereon.

20. The gaming machine of claim 17, wherein the first encrypted data is received at the interface system via a wireless connection.

21. The gaming machine of claim 17, wherein the first encryption key is also stored in the memory system and wherein the logic system is further configured to do the following:
retrieve the second encrypted data;
retrieve the first, third and fourth encryption keys; and
decrypt the second encrypted data with the first, third and fourth encryption keys.

22. The gaming machine of claim 21, wherein the decryption occurs at a logic device associated with the memory system.

23. The gaming machine of claim 21, further comprising:
a first portion of the logic system configured for operation according to the serial advanced technology attachment ("SATA") standard; and
a second portion of the logic system configured for operation according to the parallel advanced technology attachment ("PATA") standard, wherein the logic system is configured to operate at a speed of data transfer between serial the first portion and the second portion.

24. The gaming machine of claim 17, wherein the logic system is further configured to receive an indication to execute the wager gaming software, retrieve the second encrypted data, retrieve the first, third, and fourth encryption keys, and decrypt the second encrypted data with the first, third, and fourth keys to produce decrypted wager gaming software.

25. The gaming machine of claim 23, wherein the logic system encrypts the base encrypted data at a speed of data transfer between the first portion and the second portion.

26. A method, comprising:
receiving, at a device, first encrypted data formed by encrypting wager gaming software with at least first and second encryption keys;
receiving, at the device, the second encryption key;
decrypting the first encrypted data with the second encryption key to produce base encrypted data, wherein the base encrypted data is encrypted with at least the first encryption key;

deleting the second encryption key;
encrypting the base encrypted data with third and fourth encryption keys stored in a memory of the device to produce second encrypted data, wherein the second encrypted data is encrypted with at least the first, third, and fourth encryption keys to create encrypted wager gaming software encrypted with at least the first, third, and fourth encryption keys; and
storing the encrypted wager gaming software in a storage medium of the device.

27. The method of claim 26, wherein the first encrypted data are formed by encrypting the wager gaming software with first, second and fifth encryption keys.

28. The method of claim 26, further comprising:
receiving an indication of device tampering; and
deleting at least one of the third and fourth encryption keys.

29. The method of claim 26, wherein the step of receiving first encrypted data comprises receiving a portable storage medium having the first encrypted data stored thereon.

30. The method of claim 26, wherein the step of receiving first encrypted data comprises receiving the first encrypted data via an interface of the device.

31. The method of claim 26, wherein the first encryption key is also stored in a memory of the device, further comprising:
retrieving the second encrypted data;
retrieving the first, third and fourth encryption keys; and
decrypting the second encrypted data with the first, third and fourth encryption keys.

32. The method of claim 26, wherein the decrypting step comprises forming a communication between a portable storage medium and the device, the portable storage medium having the second key stored thereon.

33. The method of claim 27, wherein the decrypting step comprises forming a communication between a portable storage medium and the device, the portable storage medium having the second and fifth keys stored thereon.

34. An apparatus, comprising:
a memory system;
an interface system; and
a logic system configured to:
receive, via the interface system, first encrypted data formed by performing at least a first encryption operation and a second encryption operation on wager gaming software;
perform a first decryption operation on the first encrypted data to produce partially decrypted data;
perform a third encryption operation on the partially decrypted data to produce second encrypted data, wherein the second encrypted data comprises wager gaming software encrypted by at least the third encryption operation;
store the second encrypted data in the memory system; and
disable the first decryption operation.

35. The apparatus of claim 34, wherein the partially decrypted data are equivalent to wager gaming software encrypted via the second encryption operation.

36. The apparatus of claim 34, wherein the second encrypted data are equivalent to the wager gaming software encrypted via the second and third encryption operations.

37. The apparatus of claim 34, wherein the first encrypted data are formed by encrypting the wager gaming software via first, second and fourth encryption operations.

38. The apparatus of claim 34, wherein the memory system is further configured to store data for performing a second decryption operation and a third decryption operation, and wherein the logic system is further configured to:
receive an indication of device tampering; and
delete the data for performing at least one of the second decryption operation and the third decryption operation when an indication of device tampering is received.

39. The apparatus of claim 34, wherein the interface system is further configured to receive a portable storage medium having the first encrypted data stored thereon.

40. The apparatus of claim 34, wherein the first encrypted data is received at an interface of the apparatus.

41. The apparatus of claim 34, wherein data for performing a second decryption operation and a third decryption operation are stored in the memory system, and wherein the logic system is further configured to:
retrieve the second encrypted data;
retrieve the data for performing the second decryption operation and the third decryption operation; and
decrypt the second encrypted data with the data for performing the second decryption operation and the third decryption operation, thereby producing the wager gaming software.

42. The apparatus of claim 34, wherein the logic system is further configured to communicate with a portable storage medium having data for performing the first decryption operation stored thereon.

43. A method, comprising:
receiving first encrypted data, wherein the first encrypted data is formed by at least a first and second encryption operation, including:
encrypting wager gaming software utilizing a first encryption key to form base encrypted data; and
encrypting the base encrypted data utilizing a second encryption key;
performing a first decryption operation on the first encrypted data to reproduce the base encrypted data;
performing a third encryption operation on the base encrypted data utilizing a third encryption key to produce second encrypted data, wherein each encryption key utilizes a different algorithm, and wherein the second encrypted data comprises encrypted wager gaming software encrypted with at least the first and third encryption keys;
storing the encrypted wager gaming software in a memory of a device; and
deleting data for performing the first decryption operation.

44. The method of claim 43, wherein the first encrypted data are formed by encrypting the wager gaming software via the first and second encryption operation and a fourth encryption operation.

45. The method of claim 43, wherein data for performing a second decryption operation and a third decryption operation are stored in the device, further comprising:
receiving an indication of device tampering; and
deleting the data for performing at least one of the second decryption operation and the third decryption operation.

46. The method of claim 43, wherein the step of receiving first encrypted data comprises receiving a portable storage medium having the first encrypted data stored thereon.

47. The method of claim 43, wherein the step of receiving first encrypted data comprises receiving the first encrypted data via an interface of the device.

48. The method of claim 43, wherein data for performing a second decryption operation and a third decryption operation are stored in the device, further comprising:
- retrieving the second encrypted data;
- retrieving the data for performing the second decryption operation and the third decryption operation; and
- decrypting the second encrypted data with the data for performing the second decryption operation and the third decryption operation, thereby producing the wager gaming software.

49. The method of claim 43, wherein the decrypting step comprises forming a communication between a portable storage medium and the device, the portable storage medium having data for performing the first decryption operation stored thereon.

50. The method of claim 48, wherein the decrypting step further comprises decrypting the first encrypted data with a fourth decryption operation.

* * * * *